(12) United States Patent
Ganguli et al.

(10) Patent No.: US 11,038,815 B2
(45) Date of Patent: Jun. 15, 2021

(54) TECHNOLOGIES FOR MANAGING BURST BANDWIDTH REQUIREMENTS

(71) Applicant: Intel Corporation, Santa Clara, CA (US)

(72) Inventors: Mrittika Ganguli, Tempe, AZ (US); Anjaneya Reddy Chagam Reddy, Chandler, AZ (US); Francesc Guim Bernat, Barcelona (ES); Arvind Srinivasan, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 16/451,454

(22) Filed: Jun. 25, 2019

(65) Prior Publication Data
US 2019/0319892 A1 Oct. 17, 2019

(51) Int. Cl.
| | |
|---|---|
| *H04L 12/911* | (2013.01) |
| *H04L 12/917* | (2013.01) |
| *H04L 12/24* | (2006.01) |
| *H04L 29/08* | (2006.01) |
| *H04L 12/873* | (2013.01) |
| *H04L 12/875* | (2013.01) |

(52) U.S. Cl.
CPC ........ *H04L 47/826* (2013.01); *H04L 41/0896* (2013.01); *H04L 47/76* (2013.01); *H04L 47/781* (2013.01); *H04L 67/1095* (2013.01); *H04L 47/522* (2013.01); *H04L 47/528* (2013.01); *H04L 47/56* (2013.01); *H04L 47/745* (2013.01); *H04L 47/748* (2013.01)

(58) Field of Classification Search
CPC ..... H04L 41/0896; H04L 47/70; H04L 47/76; H04L 47/781; H04L 47/826; H04L 67/1095
See application file for complete search history.

(56) References Cited

U.S. PATENT DOCUMENTS

| | | | |
|---|---|---|---|
| 7,539,745 B1 * | 5/2009 | Wang ................. | H04L 41/5019 709/214 |
| 2017/0060696 A1 * | 3/2017 | Welinitz ............. | G06F 11/1464 |

* cited by examiner

*Primary Examiner* — Kevin C. Harper
(74) *Attorney, Agent, or Firm* — Compass IP Law, PC

(57) ABSTRACT

Technologies for managing burst bandwidth requirements are disclosed. In the illustrative embodiment, a software-defined network (SDN) controller monitors storage devices in a data center. If a storage device fails, the SDN controller manages the bandwidth used to replicate the data that was stored on the failed storage device. The SDN controller may allocate an initial amount of bandwidth based on one or more parameters of the storage device, and the SDN controller may increase the bandwidth in a series of discrete steps. In another embodiment, the SDN controller may predict a bandwidth burst based on sequential writes at a storage sled from several compute devices, and allocate bandwidth accordingly in a tiered manner.

14 Claims, 24 Drawing Sheets

TECHNOLOGIES FOR MANAGING BURST BANDWIDTH REQUIREMENTS

BACKGROUND

Bandwidth management in a software-defined-networking environment such as a data center can be a critical aspect of maintaining a desired performance level and meeting service level objectives. In certain circumstances, additional burst bandwidth may be needed, such as when a drive in a data center fails. When a drive fails, additional bandwidth may be required to replicate the data previously stored on the failed drive to an additional location, limiting the bandwidth available for other services.

In addition to failure of a drive, there may be additional circumstances where a burst of bandwidth is needed to handle data requests. For example, there may be cases when several clients request data transactions at the same storage device or storage sled.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
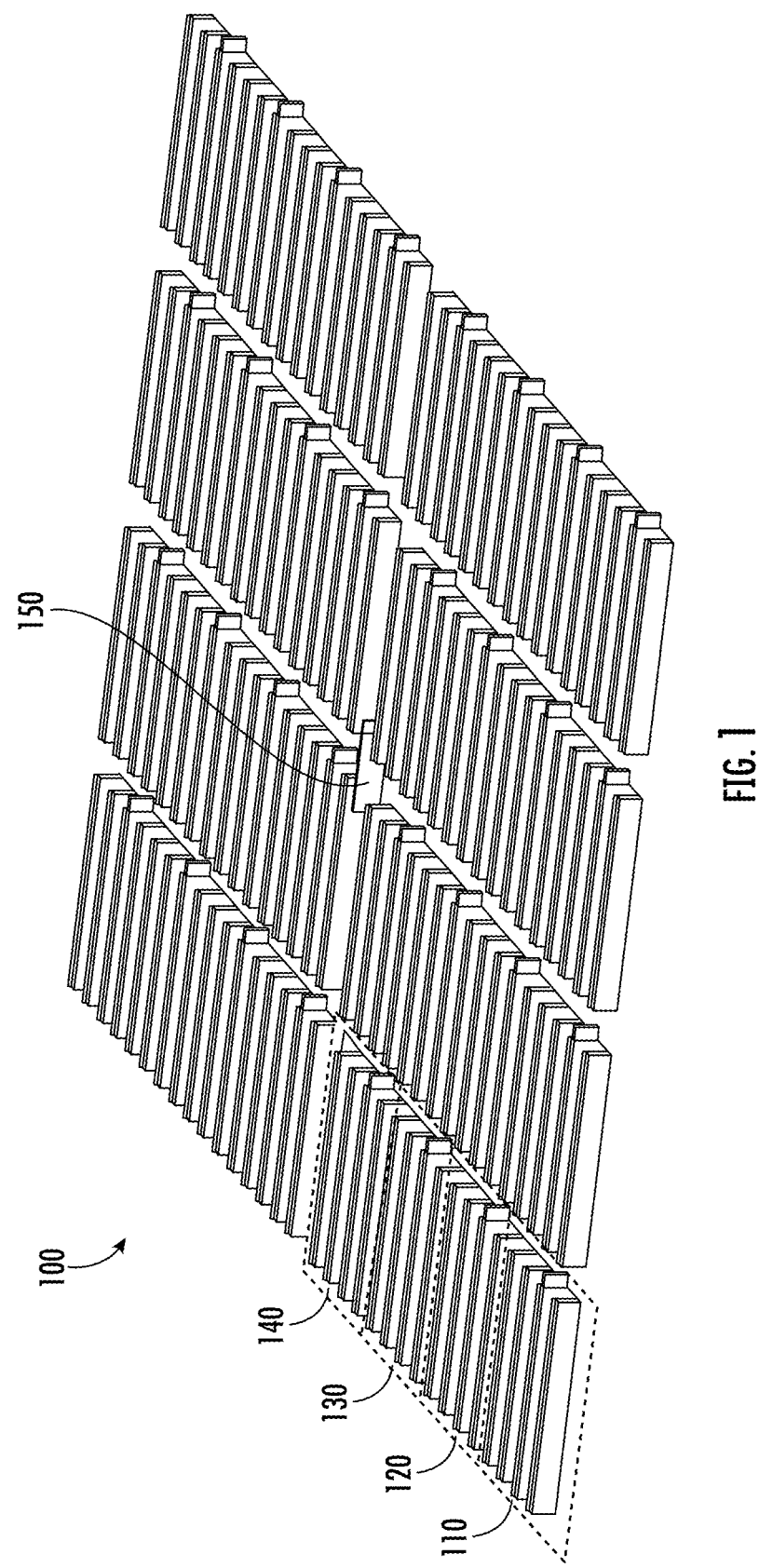
FIG. 1 is a simplified diagram of at least one embodiment of a data center for executing workloads with disaggregated resources.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or nonvolatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a data center 100 in which disaggregated resources may cooperatively execute one or more workloads (e.g., applications on behalf of customers) includes multiple pods 110, 120, 130, 140, each of which includes one or more rows of racks. Of course, although data center 100 is shown with multiple pods, in some embodiments, the data center 100 may be embodied as a single pod. As described in more detail herein, each rack houses multiple sleds, each of which may be primarily equipped with a particular type of resource (e.g., memory devices, data storage devices, accelerator devices, general purpose processors), i.e., resources that can be logically coupled to form a composed node, which can act as, for example, a server. In the illustrative embodiment, the sleds in each pod 110, 120, 130, 140 are connected to multiple pod switches (e.g., switches that route data communications to and from sleds within the pod). The pod switches, in turn, connect with spine switches 150 that switch communications among pods (e.g., the pods 110, 120, 130, 140) in the data center 100. In some embodiments, the sleds may be connected with a fabric using Intel Omni-Path technology. In other embodiments, the sleds may be connected with other fabrics, such as InfiniBand or Ethernet. As described in more detail herein, resources within sleds in the data center 100 may be allocated to a group (referred to herein as a "managed node") containing resources from one or more sleds to be collectively utilized in the execution of a workload. The workload can execute as if the resources belonging to the managed node were located on the same sled. The resources in a managed node may belong to sleds belonging to different racks, and even to different pods 110, 120, 130, 140. As such, some resources of a single sled may be allocated to one managed node while other resources of the same sled are allocated to a different managed node (e.g., one processor assigned to one managed node and another processor of the same sled assigned to a different managed node).

A data center comprising disaggregated resources, such as data center 100, can be used in a wide variety of contexts, such as enterprise, government, cloud service provider, and communications service provider (e.g., Telco's), as well in a wide variety of sizes, from cloud service provider mega-data centers that consume over 100,000 sq. ft. to single- or multi-rack installations for use in base stations.

The disaggregation of resources to sleds comprised predominantly of a single type of resource (e.g., compute sleds comprising primarily compute resources, memory sleds containing primarily memory resources), and the selective allocation and deallocation of the disaggregated resources to form a managed node assigned to execute a workload improves the operation and resource usage of the data center 100 relative to typical data centers comprised of hyperconverged servers containing compute, memory, storage and perhaps additional resources in a single chassis. For example, because sleds predominantly contain resources of a particular type, resources of a given type can be upgraded independently of other resources. Additionally, because different resources types (processors, storage, accelerators, etc.) typically have different refresh rates, greater resource utilization and reduced total cost of ownership may be achieved. For example, a data center operator can upgrade the processors throughout their facility by only swapping out the compute sleds. In such a case, accelerator and storage resources may not be contemporaneously upgraded and, rather, may be allowed to continue operating until those resources are scheduled for their own refresh. Resource utilization may also increase. For example, if managed nodes are composed based on requirements of the workloads that will be running on them, resources within a node are more likely to be fully utilized. Such utilization may allow for more managed nodes to run in a data center with a given set of resources, or for a data center expected to run a given set of workloads, to be built using fewer resources.

Figure 2:
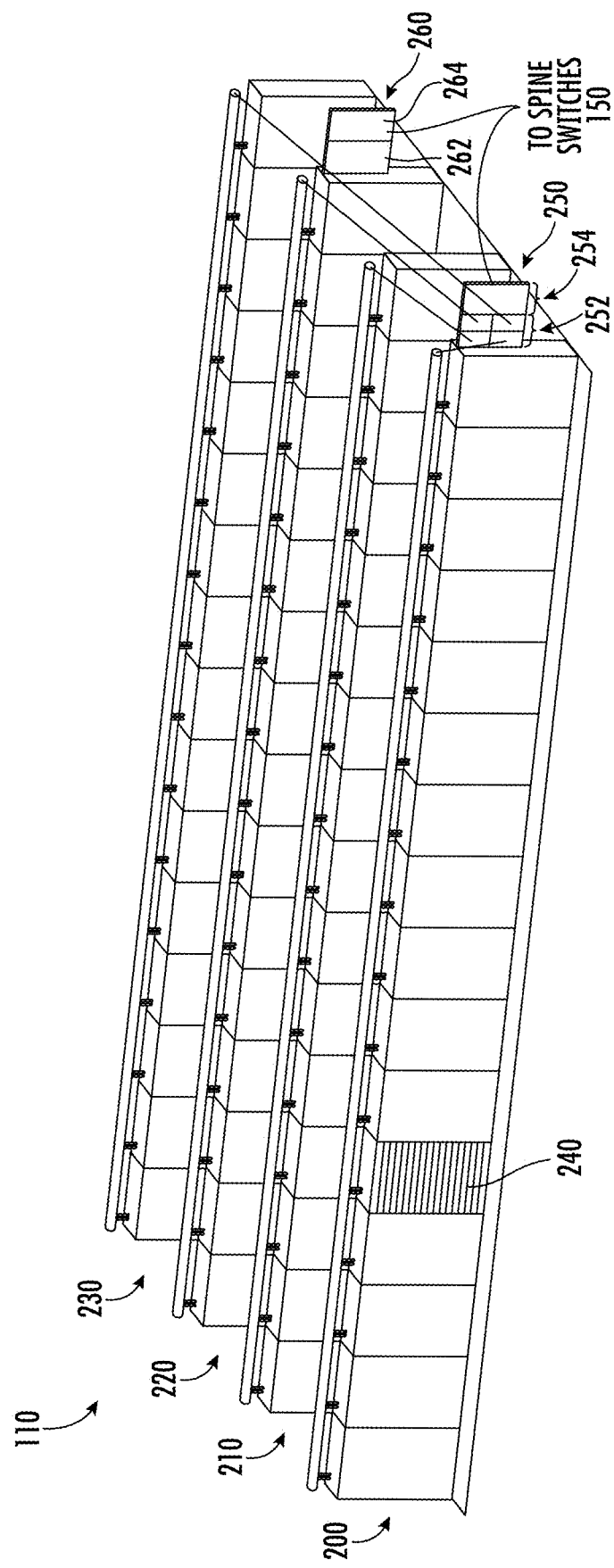
FIG. 2 is a simplified diagram of at least one embodiment of a pod that may be included in the data center of FIG. 1.

Referring now to FIG. 2, the pod 110, in the illustrative embodiment, includes a set of rows 200, 210, 220, 230 of racks 240. Each rack 240 may house multiple sleds (e.g., sixteen sleds) and provide power and data connections to the housed sleds, as described in more detail herein. In the illustrative embodiment, the racks in each row 200, 210, 220, 230 are connected to multiple pod switches 250, 260. The pod switch 250 includes a set of ports 252 to which the sleds of the racks of the pod 110 are connected and another set of ports 254 that connect the pod 110 to the spine switches 150 to provide connectivity to other pods in the data center 100. Similarly, the pod switch 260 includes a set of ports 262 to which the sleds of the racks of the pod 110 are connected and a set of ports 264 that connect the pod 110 to the spine switches 150. As such, the use of the pair of switches 250, 260 provides an amount of redundancy to the pod 110. For example, if either of the switches 250, 260 fails, the sleds in the pod 110 may still maintain data communication with the remainder of the data center 100 (e.g., sleds of other pods) through the other switch 250, 260. Furthermore, in the illustrative embodiment, the switches 150, 250, 260 may be embodied as dual-mode optical switches, capable of routing both Ethernet protocol communications carrying Internet Protocol (IP) packets and communications according to a second, high-performance link-layer protocol (e.g., Intel's Omni-Path Architecture's, InfiniBand, PCI Express) via optical signaling media of an optical fabric.

It should be appreciated that each of the other pods 120, 130, 140 (as well as any additional pods of the data center 100) may be similarly structured as, and have components similar to, the pod 110 shown in and described in regard to FIG. 2 (e.g., each pod may have rows of racks housing multiple sleds as described above). Additionally, while two pod switches 250, 260 are shown, it should be understood that in other embodiments, each pod 110, 120, 130, 140 may be connected to a different number of pod switches, providing even more failover capacity. Of course, in other embodiments, pods may be arranged differently than the rows-of-racks configuration shown in FIGS. 1-2. For example, a pod may be embodied as multiple sets of racks in which each set of racks is arranged radially, i.e., the racks are equidistant from a center switch.

Figure 3:
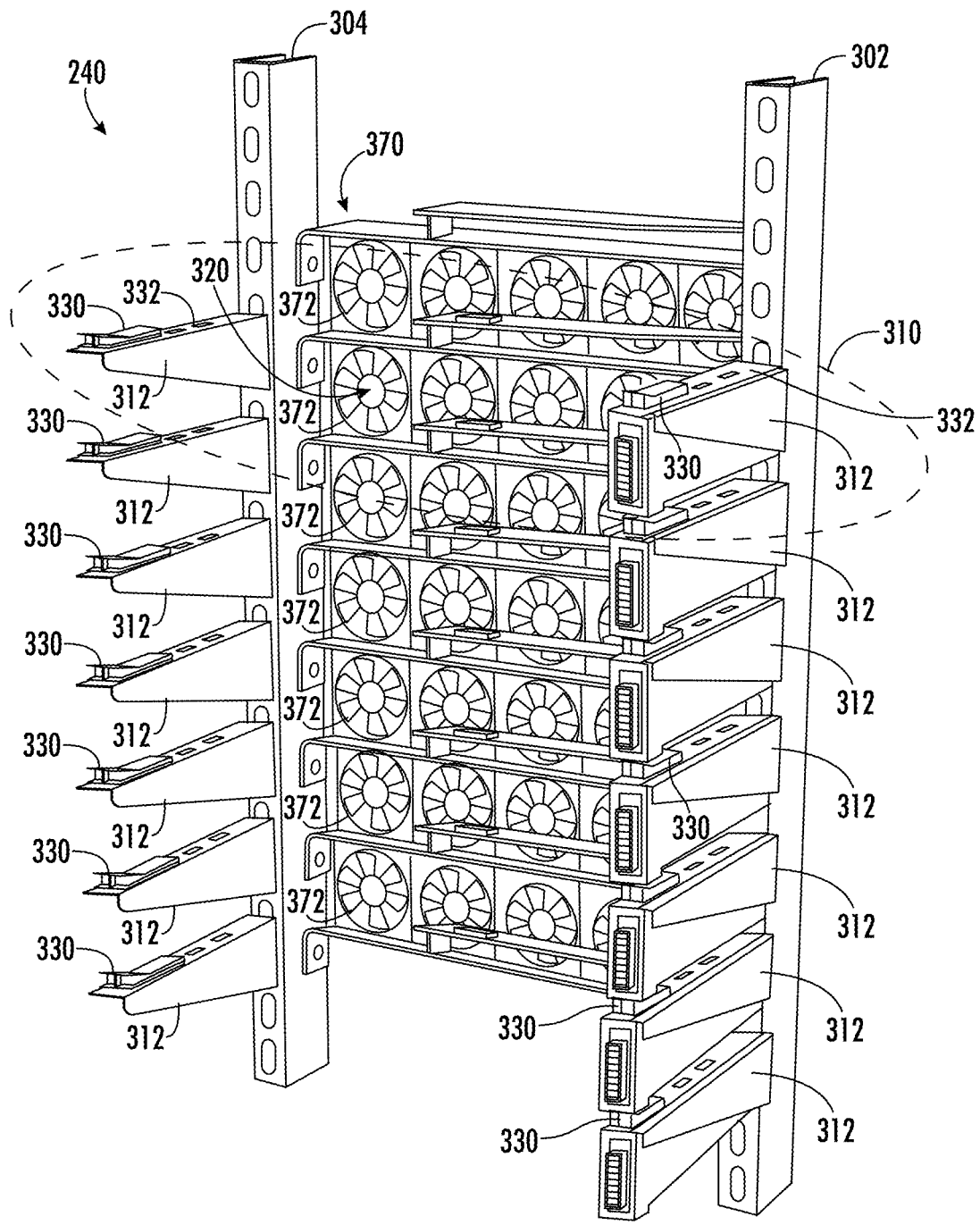
FIG. 3 is a perspective view of at least one embodiment of a rack that may be included in the pod of FIG. 2.
Figure 4:
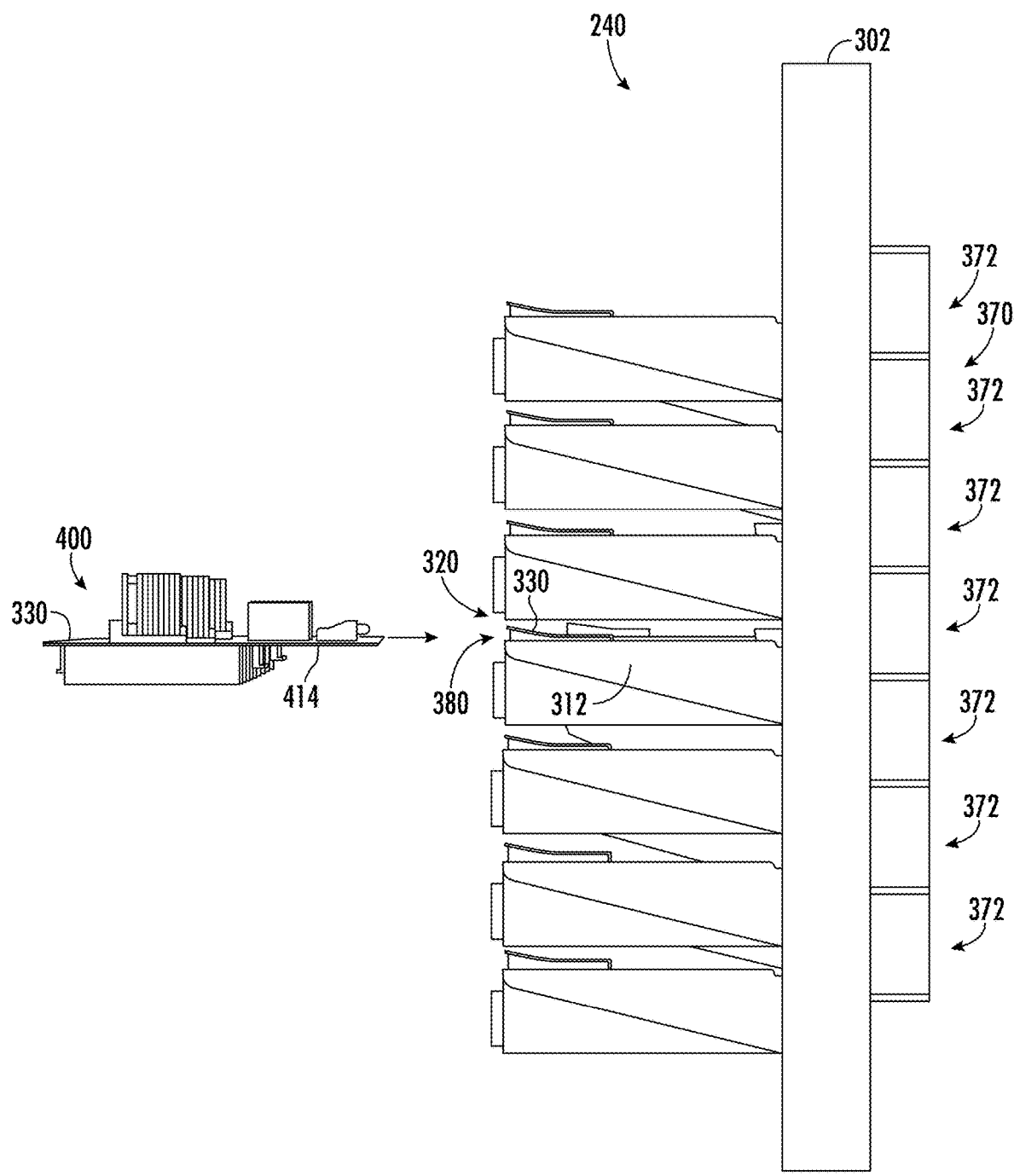
FIG. 4 is a side elevation view of the rack of FIG. 3.
Figure 5:
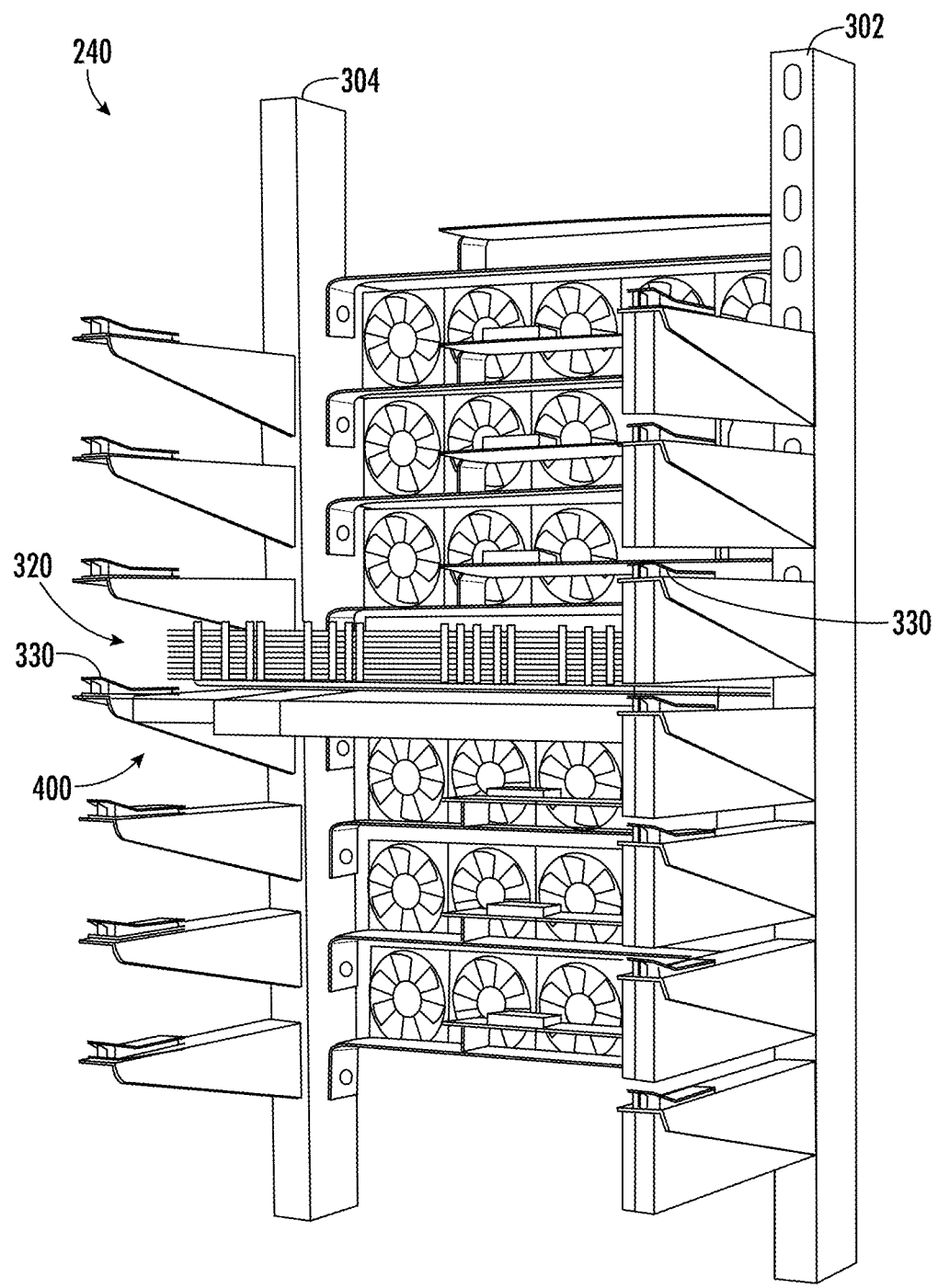
FIG. 5 is a perspective view of the rack of FIG. 3 having a sled mounted therein.

Referring now to FIGS. 3-5, each illustrative rack 240 of the data center 100 includes two elongated support posts 302, 304, which are arranged vertically. For example, the elongated support posts 302, 304 may extend upwardly from a floor of the data center 100 when deployed. The rack 240 also includes one or more horizontal pairs 310 of elongated support arms 312 (identified in FIG. 3 via a dashed ellipse) configured to support a sled of the data center 100 as discussed below. One elongated support arm 312 of the pair of elongated support arms 312 extends outwardly from the elongated support post 302 and the other elongated support arm 312 extends outwardly from the elongated support post 304.

In the illustrative embodiments, each sled of the data center 100 is embodied as a chassis-less sled. That is, each sled has a chassis-less circuit board substrate on which physical resources (e.g., processors, memory, accelerators, storage, etc.) are mounted as discussed in more detail below. As such, the rack 240 is configured to receive the chassis-less sleds. For example, each pair 310 of elongated support arms 312 defines a sled slot 320 of the rack 240, which is configured to receive a corresponding chassis-less sled. To do so, each illustrative elongated support arm 312 includes a circuit board guide 330 configured to receive the chassis-less circuit board substrate of the sled. Each circuit board guide 330 is secured to, or otherwise mounted to, a top side 332 of the corresponding elongated support arm 312. For example, in the illustrative embodiment, each circuit board guide 330 is mounted at a distal end of the corresponding elongated support arm 312 relative to the corresponding elongated support post 302, 304. For clarity of the Figures, not every circuit board guide 330 may be referenced in each Figure.

Each circuit board guide 330 includes an inner wall that defines a circuit board slot 380 configured to receive the chassis-less circuit board substrate of a sled 400 when the sled 400 is received in the corresponding sled slot 320 of the rack 240. To do so, as shown in FIG. 4, a user (or robot) aligns the chassis-less circuit board substrate of an illustrative chassis-less sled 400 to a sled slot 320. The user, or robot, may then slide the chassis-less circuit board substrate forward into the sled slot 320 such that each side edge 414 of the chassis-less circuit board substrate is received in a corresponding circuit board slot 380 of the circuit board guides 330 of the pair 310 of elongated support arms 312 that define the corresponding sled slot 320 as shown in FIG. 4. By having robotically accessible and robotically manipulable sleds comprising disaggregated resources, each type of resource can be upgraded independently of each other and at their own optimized refresh rate. Furthermore, the sleds are configured to blindly mate with power and data communication cables in each rack 240, enhancing their ability to be quickly removed, upgraded, reinstalled, and/or replaced. As such, in some embodiments, the data center 100 may operate (e.g., execute workloads, undergo maintenance and/or upgrades, etc.) without human involvement on the data center floor. In other embodiments, a human may facilitate one or more maintenance or upgrade operations in the data center 100.

It should be appreciated that each circuit board guide 330 is dual sided. That is, each circuit board guide 330 includes an inner wall that defines a circuit board slot 380 on each side of the circuit board guide 330. In this way, each circuit board guide 330 can support a chassis-less circuit board substrate on either side. As such, a single additional elongated support post may be added to the rack 240 to turn the rack 240 into a two-rack solution that can hold twice as many sled slots 320 as shown in FIG. 3. The illustrative rack 240 includes seven pairs 310 of elongated support arms 312 that define a corresponding seven sled slots 320, each configured to receive and support a corresponding sled 400 as discussed above. Of course, in other embodiments, the rack 240 may include additional or fewer pairs 310 of elongated support arms 312 (i.e., additional or fewer sled slots 320). It should be appreciated that because the sled 400 is chassis-less, the sled 400 may have an overall height that is different than typical servers. As such, in some embodiments, the height of each sled slot 320 may be shorter than the height of a typical server (e.g., shorter than a single rank unit, "1U"). That is, the vertical distance between each pair 310 of elongated support arms 312 may be less than a standard rack unit "1U." Additionally, due to the relative decrease in height of the sled slots 320, the overall height of the rack 240 in some embodiments may be shorter than the height of traditional rack enclosures. For example, in some embodiments, each of the elongated support posts 302, 304 may have a length of six feet or less. Again, in other embodiments, the rack 240 may have different dimensions. For example, in some embodiments, the vertical distance between each pair 310 of elongated support arms 312 may be greater than a standard rack until "1U". In such embodiments, the increased vertical distance between the sleds allows for larger heat sinks to be attached to the physical resources and for larger fans to be used (e.g., in the fan array 370 described below) for cooling each sled, which in turn can allow the physical resources to operate at increased power levels. Further, it should be appreciated that the rack 240 does not include any walls, enclosures, or the like. Rather, the rack 240 is an enclosure-less rack that is opened to the local environment. Of course, in some cases, an end plate may be attached to one of the elongated support posts 302, 304 in those situations in which the rack 240 forms an end-of-row rack in the data center 100.

In some embodiments, various interconnects may be routed upwardly or downwardly through the elongated support posts 302, 304. To facilitate such routing, each elongated support post 302, 304 includes an inner wall that defines an inner chamber in which interconnects may be located. The interconnects routed through the elongated support posts 302, 304 may be embodied as any type of interconnects including, but not limited to, data or communication interconnects to provide communication connections to each sled slot 320, power interconnects to provide power to each sled slot 320, and/or other types of interconnects.

The rack 240, in the illustrative embodiment, includes a support platform on which a corresponding optical data connector (not shown) is mounted. Each optical data connector is associated with a corresponding sled slot 320 and is configured to mate with an optical data connector of a corresponding sled 400 when the sled 400 is received in the corresponding sled slot 320. In some embodiments, optical connections between components (e.g., sleds, racks, and switches) in the data center 100 are made with a blind mate optical connection. For example, a door on each cable may prevent dust from contaminating the fiber inside the cable. In the process of connecting to a blind mate optical connector mechanism, the door is pushed open when the end of the cable approaches or enters the connector mechanism. Subsequently, the optical fiber inside the cable may enter a gel within the connector mechanism and the optical fiber of one cable comes into contact with the optical fiber of another cable within the gel inside the connector mechanism.

The illustrative rack 240 also includes a fan array 370 coupled to the cross-support arms of the rack 240. The fan array 370 includes one or more rows of cooling fans 372, which are aligned in a horizontal line between the elongated support posts 302, 304. In the illustrative embodiment, the fan array 370 includes a row of cooling fans 372 for each sled slot 320 of the rack 240. As discussed above, each sled 400 does not include any on-board cooling system in the illustrative embodiment and, as such, the fan array 370 provides cooling for each sled 400 received in the rack 240. Each rack 240, in the illustrative embodiment, also includes a power supply associated with each sled slot 320. Each power supply is secured to one of the elongated support arms 312 of the pair 310 of elongated support arms 312 that define the corresponding sled slot 320. For example, the rack 240 may include a power supply coupled or secured to each elongated support arm 312 extending from the elongated support post 302. Each power supply includes a power connector configured to mate with a power connector of the sled 400 when the sled 400 is received in the corresponding sled slot 320. In the illustrative embodiment, the sled 400 does not include any on-board power supply and, as such, the power supplies provided in the rack 240 supply power to corresponding sleds 400 when mounted to the rack 240. Each power supply is configured to satisfy the power requirements for its associated sled, which can vary from sled to sled. Additionally, the power supplies provided in the rack 240 can operate independent of each other. That is, within a single rack, a first power supply providing power to a compute sled can provide power levels that are different than power levels supplied by a second power supply providing power to an accelerator sled. The power supplies may be controllable at the sled level or rack level, and may be controlled locally by components on the associated sled or remotely, such as by another sled or an orchestrator.

Figure 6:
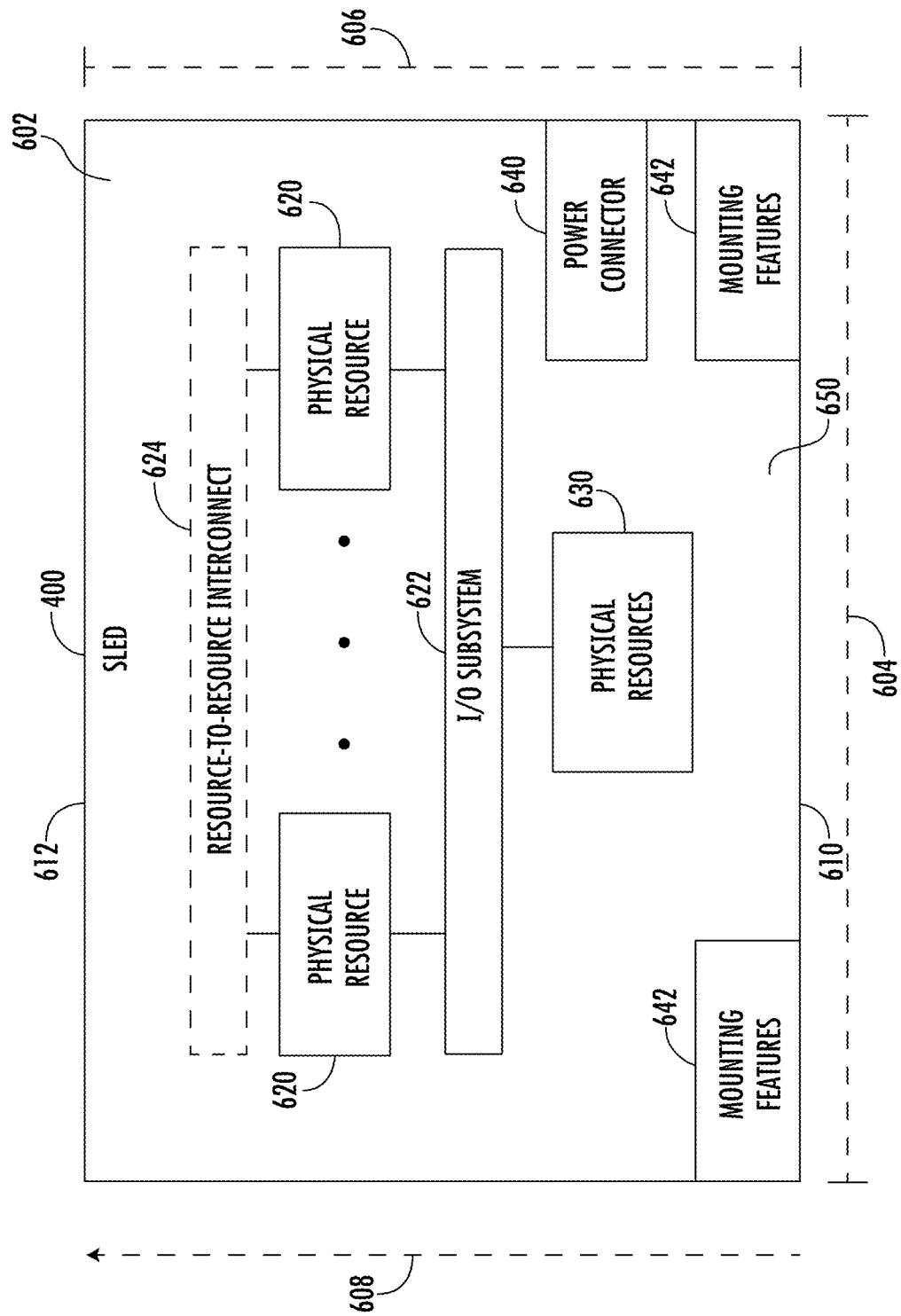
FIG. 6 is a is a simplified block diagram of at least one embodiment of a top side of the sled of FIG. 5.

Referring now to FIG. 6, the sled 400, in the illustrative embodiment, is configured to be mounted in a corresponding rack 240 of the data center 100 as discussed above. In some embodiments, each sled 400 may be optimized or otherwise configured for performing particular tasks, such as compute tasks, acceleration tasks, data storage tasks, etc. For example, the sled 400 may be embodied as a compute sled 800 as discussed below in regard to FIGS. 8-9, an accelerator sled 1000 as discussed below in regard to FIGS. 10-11, a storage sled 1200 as discussed below in regard to FIGS. 12-13, or as a sled optimized or otherwise configured to perform other specialized tasks, such as a memory sled 1400, discussed below in regard to FIG. 14.

As discussed above, the illustrative sled 400 includes a chassis-less circuit board substrate 602, which supports various physical resources (e.g., electrical components) mounted thereon. It should be appreciated that the circuit board substrate 602 is "chassis-less" in that the sled 400 does not include a housing or enclosure. Rather, the chassis-less circuit board substrate 602 is open to the local environment. The chassis-less circuit board substrate 602 may be formed from any material capable of supporting the various electrical components mounted thereon. For example, in an illustrative embodiment, the chassis-less circuit board substrate 602 is formed from an FR-4 glass-reinforced epoxy laminate material. Of course, other materials may be used to form the chassis-less circuit board substrate 602 in other embodiments.

As discussed in more detail below, the chassis-less circuit board substrate 602 includes multiple features that improve the thermal cooling characteristics of the various electrical components mounted on the chassis-less circuit board substrate 602. As discussed, the chassis-less circuit board substrate 602 does not include a housing or enclosure, which may improve the airflow over the electrical components of the sled 400 by reducing those structures that may inhibit air flow. For example, because the chassis-less circuit board substrate 602 is not positioned in an individual housing or enclosure, there is no vertically-arranged backplane (e.g., a backplate of the chassis) attached to the chassis-less circuit board substrate 602, which could inhibit air flow across the electrical components. Additionally, the chassis-less circuit board substrate 602 has a geometric shape configured to reduce the length of the airflow path across the electrical components mounted to the chassis-less circuit board substrate 602. For example, the illustrative chassis-less circuit board substrate 602 has a width 604 that is greater than a depth 606 of the chassis-less circuit board substrate 602. In one particular embodiment, for example, the chassis-less circuit board substrate 602 has a width of about 21 inches and a depth of about 9 inches, compared to a typical server that has a width of about 17 inches and a depth of about 39 inches. As such, an airflow path 608 that extends from a front edge 610 of the chassis-less circuit board substrate 602 toward a rear edge 612 has a shorter distance relative to typical servers, which may improve the thermal cooling characteristics of the sled 400. Furthermore, although not illustrated in FIG. 6, the various physical resources mounted to the chassis-less circuit board substrate 602 are mounted in corresponding locations such that no two substantively heat-producing electrical components shadow each other as discussed in more detail below. That is, no two electrical components, which produce appreciable heat during operation (i.e., greater than a nominal heat sufficient enough to adversely impact the cooling of another electrical component), are mounted to the chassis-less circuit board substrate 602 linearly in-line with each other along the direction of the airflow path 608 (i.e., along a direction extending from the front edge 610 toward the rear edge 612 of the chassis-less circuit board substrate 602).

As discussed above, the illustrative sled 400 includes one or more physical resources 620 mounted to a top side 650 of the chassis-less circuit board substrate 602. Although two physical resources 620 are shown in FIG. 6, it should be appreciated that the sled 400 may include one, two, or more physical resources 620 in other embodiments. The physical resources 620 may be embodied as any type of processor, controller, or other compute circuit capable of performing various tasks such as compute functions and/or controlling the functions of the sled 400 depending on, for example, the type or intended functionality of the sled 400. For example, as discussed in more detail below, the physical resources 620 may be embodied as high-performance processors in embodiments in which the sled 400 is embodied as a compute sled, as accelerator co-processors or circuits in embodiments in which the sled 400 is embodied as an accelerator sled, storage controllers in embodiments in which the sled 400 is embodied as a storage sled, or a set of memory devices in embodiments in which the sled 400 is embodied as a memory sled.

The sled 400 also includes one or more additional physical resources 630 mounted to the top side 650 of the chassis-less circuit board substrate 602. In the illustrative embodiment, the additional physical resources include a network interface controller (NIC) as discussed in more detail below. Of course, depending on the type and functionality of the sled 400, the physical resources 630 may include additional or other electrical components, circuits, and/or devices in other embodiments.

The physical resources 620 are communicatively coupled to the physical resources 630 via an input/output (I/O) subsystem 622. The I/O subsystem 622 may be embodied as circuitry and/or components to facilitate input/output operations with the physical resources 620, the physical resources 630, and/or other components of the sled 400. For example, the I/O subsystem 622 may be embodied as, or otherwise include, memory controller hubs, input/output control hubs, integrated sensor hubs, firmware devices, communication links (e.g., point-to-point links, bus links, wires, cables, waveguides, light guides, printed circuit board traces, etc.), and/or other components and subsystems to facilitate the input/output operations. In the illustrative embodiment, the I/O subsystem 622 is embodied as, or otherwise includes, a double data rate 4 (DDR4) data bus or a DDR5 data bus, as described further below.

In some embodiments, the sled 400 may also include a resource-to-resource interconnect 624. The resource-to-resource interconnect 624 may be embodied as any type of communication interconnect capable of facilitating resource-to-resource communications. In the illustrative embodiment, the resource-to-resource interconnect 624 is embodied as a high-speed point-to-point interconnect (e.g., faster than the I/O subsystem 622). For example, the resource-to-resource interconnect 624 may be embodied as a QuickPath Interconnect (QPI), an UltraPath Interconnect (UPI), or other high-speed point-to-point interconnect dedicated to resource-to-resource communications.

The sled 400 also includes a power connector 640 configured to mate with a corresponding power connector of the rack 240 when the sled 400 is mounted in the corresponding rack 240. The sled 400 receives power from a power supply of the rack 240 via the power connector 640 to supply power to the various electrical components of the sled 400. That is, the sled 400 does not include any local power supply (i.e., an on-board power supply) to provide power to the electrical components of the sled 400. The exclusion of a local or on-board power supply facilitates the reduction in the overall footprint of the chassis-less circuit board substrate 602, which may increase the thermal cooling characteristics of the various electrical components mounted on the chassis-less circuit board substrate 602 as discussed above. In some embodiments, voltage regulators are placed on a bottom side 750 (see FIG. 7) of the chassis-less circuit board substrate 602 directly opposite of the processors 820 (see FIG. 8), and power is routed from the voltage regulators to the processors 820 by vias extending through the circuit board substrate 602. Such a configuration provides an increased thermal budget, additional current and/or voltage, and better voltage control relative to typical printed circuit boards in which processor power is delivered from a voltage regulator, in part, by printed circuit traces.

In some embodiments, the sled 400 may also include mounting features 642 configured to mate with a mounting arm, or other structure, of a robot to facilitate the placement of the sled 600 in a rack 240 by the robot. The mounting features 642 may be embodied as any type of physical structures that allow the robot to grasp the sled 400 without damaging the chassis-less circuit board substrate 602 or the electrical components mounted thereto. For example, in some embodiments, the mounting features 642 may be embodied as non-conductive pads attached to the chassis-less circuit board substrate 602. In other embodiments, the mounting features may be embodied as brackets, braces, or other similar structures attached to the chassis-less circuit board substrate 602. The particular number, shape, size, and/or make-up of the mounting feature 642 may depend on the design of the robot configured to manage the sled 400.

Figure 7:
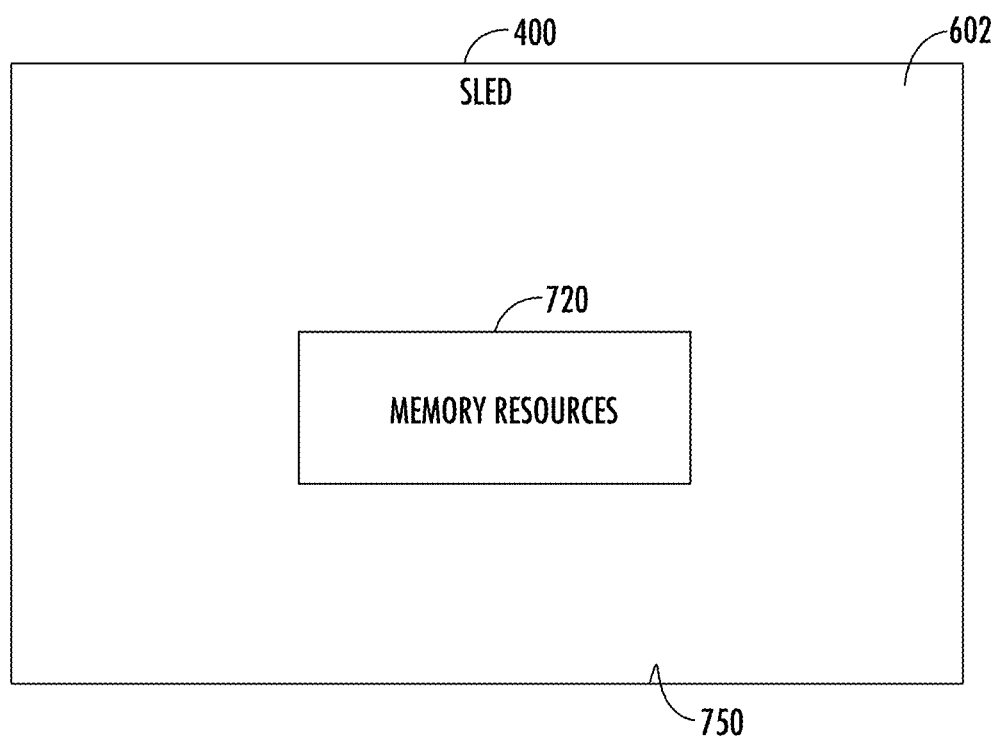
FIG. 7 is a simplified block diagram of at least one embodiment of a bottom side of the sled of FIG. 6.

Referring now to FIG. 7, in addition to the physical resources 630 mounted on the top side 650 of the chassis-less circuit board substrate 602, the sled 400 also includes one or more memory devices 720 mounted to a bottom side 750 of the chassis-less circuit board substrate 602. That is, the chassis-less circuit board substrate 602 is embodied as a double-sided circuit board. The physical resources 620 are communicatively coupled to the memory devices 720 via the I/O subsystem 622. For example, the physical resources 620 and the memory devices 720 may be communicatively coupled by one or more vias extending through the chassis-less circuit board substrate 602. Each physical resource 620 may be communicatively coupled to a different set of one or more memory devices 720 in some embodiments. Alternatively, in other embodiments, each physical resource 620 may be communicatively coupled to each memory device 720.

The memory devices 720 may be embodied as any type of memory device capable of storing data for the physical resources 620 during operation of the sled 400, such as any type of volatile (e.g., dynamic random access memory (DRAM), etc.) or nonvolatile memory. Volatile memory may be a memory that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by the Joint Electronic Device Engineering Council (JEDEC), such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the memory devices that implement such standards may be referred to as DDR-based interfaces.

In one embodiment, the memory device is a block addressable memory device, such as those based on NAND or NOR technologies, such as multi-threshold level NAND flash memory or NOR flash memory. A memory device may also include byte addressable write-in-place nonvolatile memory devices, such as Intel 3D XPoint™ memory, Intel Optane™ memory, Micron QuantX™ memory, magnetoresistive random access memory (MRAM) memory that incorporates memristor technology, or other byte addressable write-in-place nonvolatile memory devices. In some embodiments, the memory device may comprise a transistor-less stackable cross point architecture in which memory cells sit at the intersection of word lines and bit lines and are individually addressable and in which bit storage is based on a change in bulk resistance. In one embodiment, the memory device may be or may include memory devices that use chalcogenide glass, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

Figure 8:
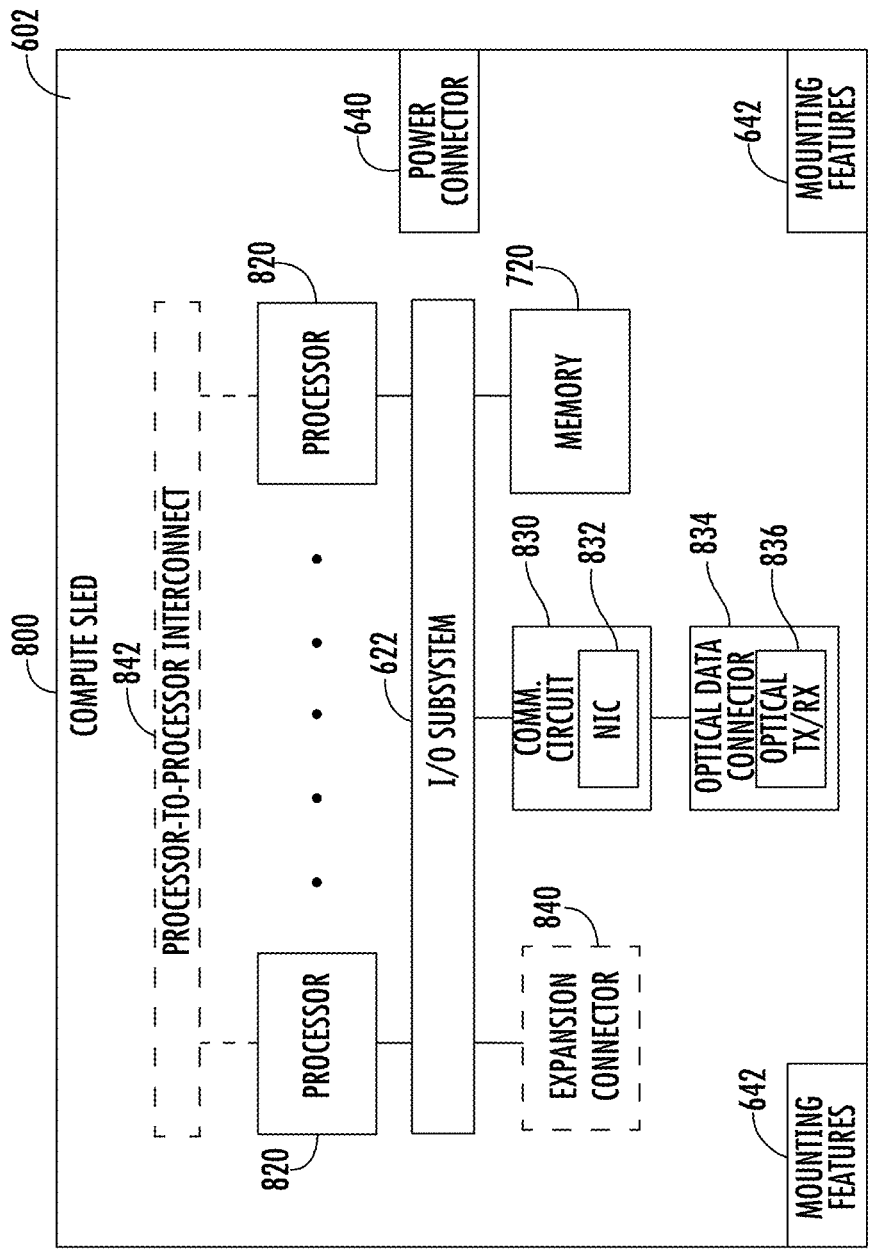
FIG. 8 is a simplified block diagram of at least one embodiment of a compute sled usable in the data center of FIG. 1.

Referring now to FIG. 8, in some embodiments, the sled 400 may be embodied as a compute sled 800. The compute sled 800 is optimized, or otherwise configured, to perform compute tasks. Of course, as discussed above, the compute sled 800 may rely on other sleds, such as acceleration sleds and/or storage sleds, to perform such compute tasks. The compute sled 800 includes various physical resources (e.g., electrical components) similar to the physical resources of the sled 400, which have been identified in FIG. 8 using the same reference numbers. The description of such components provided above in regard to FIGS. 6 and 7 applies to the corresponding components of the compute sled 800 and is not repeated herein for clarity of the description of the compute sled 800.

In the illustrative compute sled 800, the physical resources 620 are embodied as processors 820. Although only two processors 820 are shown in FIG. 8, it should be appreciated that the compute sled 800 may include additional processors 820 in other embodiments. Illustratively, the processors 820 are embodied as high-performance processors 820 and may be configured to operate at a relatively high power rating. Although the processors 820 generate additional heat operating at power ratings greater than typical processors (which operate at around 155-230 W), the enhanced thermal cooling characteristics of the chassis-less circuit board substrate 602 discussed above facilitate the higher power operation. For example, in the illustrative embodiment, the processors 820 are configured to operate at a power rating of at least 250 W. In some embodiments, the processors 820 may be configured to operate at a power rating of at least 350 W.

In some embodiments, the compute sled 800 may also include a processor-to-processor interconnect 842. Similar to the resource-to-resource interconnect 624 of the sled 400 discussed above, the processor-to-processor interconnect 842 may be embodied as any type of communication interconnect capable of facilitating processor-to-processor interconnect 842 communications. In the illustrative embodiment, the processor-to-processor interconnect 842 is embodied as a high-speed point-to-point interconnect (e.g., faster than the I/O subsystem 622). For example, the processor-to-processor interconnect 842 may be embodied as a QuickPath Interconnect (QPI), an UltraPath Interconnect (UPI), or other high-speed point-to-point interconnect dedicated to processor-to-processor communications.

The compute sled 800 also includes a communication circuit 830. The illustrative communication circuit 830 includes a network interface controller (NIC) 832, which may also be referred to as a host fabric interface (HFI). The NIC 832 may be embodied as, or otherwise include, any type of integrated circuit, discrete circuits, controller chips, chipsets, add-in-boards, daughtercards, network interface cards, or other devices that may be used by the compute sled 800 to connect with another compute device (e.g., with other sleds 400). In some embodiments, the NIC 832 may be embodied as part of a system-on-a-chip (SoC) that includes one or more processors, or included on a multichip package that also contains one or more processors. In some embodiments, the NIC 832 may include a local processor (not shown) and/or a local memory (not shown) that are both local to the NIC 832. In such embodiments, the local processor of the NIC 832 may be capable of performing one or more of the functions of the processors 820. Additionally or alternatively, in such embodiments, the local memory of the NIC 832 may be integrated into one or more components of the compute sled at the board level, socket level, chip level, and/or other levels.

The communication circuit 830 is communicatively coupled to an optical data connector 834. The optical data connector 834 is configured to mate with a corresponding optical data connector of the rack 240 when the compute sled 800 is mounted in the rack 240. Illustratively, the optical data connector 834 includes a plurality of optical fibers which lead from a mating surface of the optical data connector 834 to an optical transceiver 836. The optical transceiver 836 is configured to convert incoming optical signals from the rack-side optical data connector to electrical signals and to convert electrical signals to outgoing optical signals to the rack-side optical data connector. Although shown as forming part of the optical data connector 834 in the illustrative embodiment, the optical transceiver 836 may form a portion of the communication circuit 830 in other embodiments.

In some embodiments, the compute sled 800 may also include an expansion connector 840. In such embodiments, the expansion connector 840 is configured to mate with a corresponding connector of an expansion chassis-less circuit board substrate to provide additional physical resources to the compute sled 800. The additional physical resources may be used, for example, by the processors 820 during operation of the compute sled 800. The expansion chassis-less circuit board substrate may be substantially similar to the chassis-less circuit board substrate 602 discussed above and may include various electrical components mounted thereto. The particular electrical components mounted to the expansion chassis-less circuit board substrate may depend on the intended functionality of the expansion chassis-less circuit board substrate. For example, the expansion chassis-less circuit board substrate may provide additional compute resources, memory resources, and/or storage resources. As such, the additional physical resources of the expansion chassis-less circuit board substrate may include, but is not limited to, processors, memory devices, storage devices, and/or accelerator circuits including, for example, field programmable gate arrays (FPGA), application-specific integrated circuits (ASICs), security co-processors, graphics processing units (GPUs), machine learning circuits, or other specialized processors, controllers, devices, and/or circuits.

Figure 9:
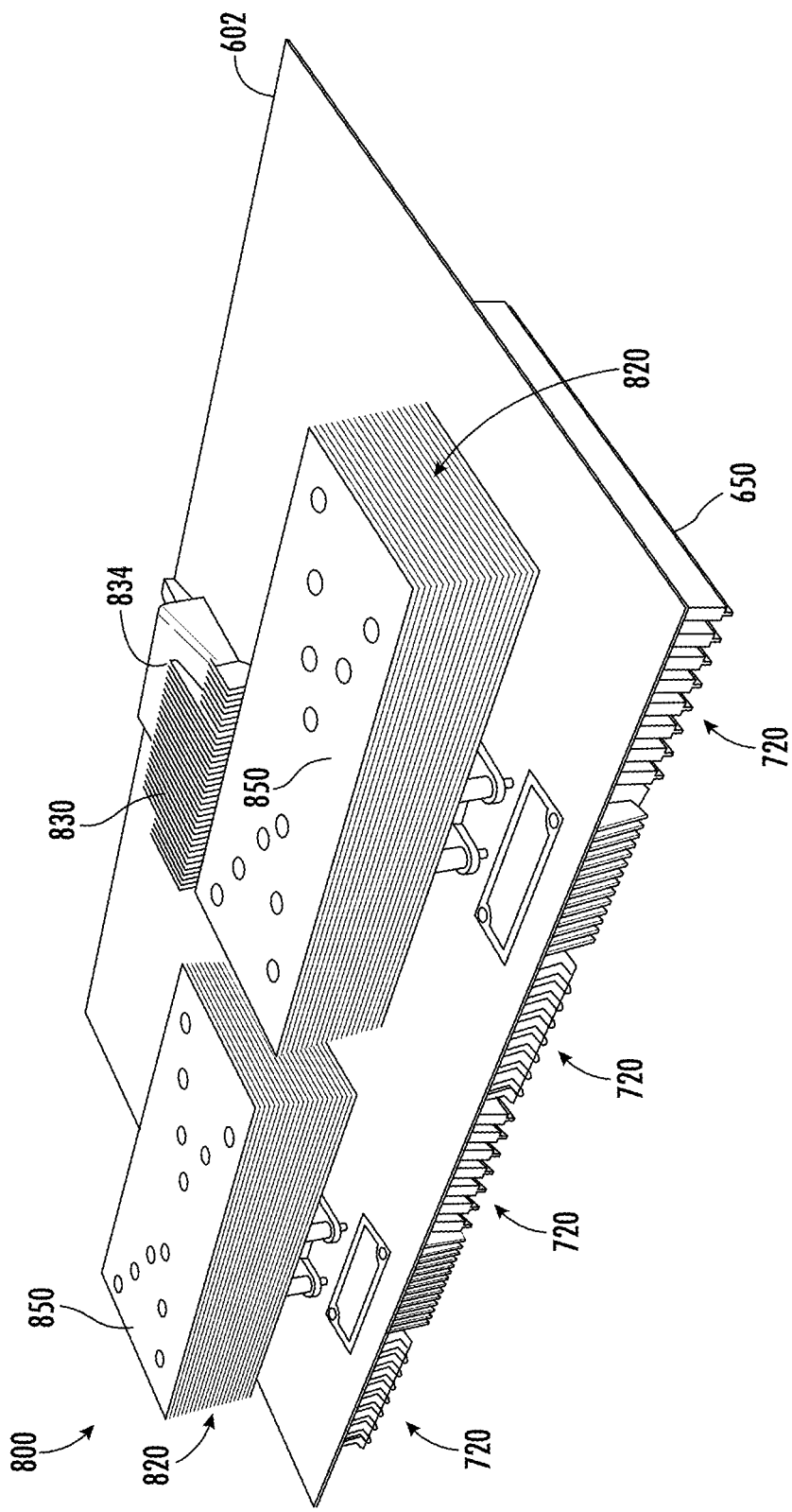
FIG. 9 is a top perspective view of at least one embodiment of the compute sled of FIG. 8.

Referring now to FIG. 9, an illustrative embodiment of the compute sled 800 is shown. As shown, the processors 820, communication circuit 830, and optical data connector 834 are mounted to the top side 650 of the chassis-less circuit board substrate 602. Any suitable attachment or mounting technology may be used to mount the physical resources of the compute sled 800 to the chassis-less circuit board substrate 602. For example, the various physical resources may be mounted in corresponding sockets (e.g., a processor socket), holders, or brackets. In some cases, some of the electrical components may be directly mounted to the chassis-less circuit board substrate 602 via soldering or similar techniques.

As discussed above, the individual processors 820 and communication circuit 830 are mounted to the top side 650 of the chassis-less circuit board substrate 602 such that no two heat-producing, electrical components shadow each other. In the illustrative embodiment, the processors 820 and communication circuit 830 are mounted in corresponding locations on the top side 650 of the chassis-less circuit board substrate 602 such that no two of those physical resources are linearly in-line with others along the direction of the airflow path 608. It should be appreciated that, although the optical data connector 834 is in-line with the communication circuit 830, the optical data connector 834 produces no or nominal heat during operation.

The memory devices 720 of the compute sled 800 are mounted to the bottom side 750 of the of the chassis-less circuit board substrate 602 as discussed above in regard to the sled 400. Although mounted to the bottom side 750, the memory devices 720 are communicatively coupled to the processors 820 located on the top side 650 via the I/O subsystem 622. Because the chassis-less circuit board substrate 602 is embodied as a double-sided circuit board, the memory devices 720 and the processors 820 may be communicatively coupled by one or more vias, connectors, or other mechanisms extending through the chassis-less circuit board substrate 602. Of course, each processor 820 may be communicatively coupled to a different set of one or more memory devices 720 in some embodiments. Alternatively, in other embodiments, each processor 820 may be communicatively coupled to each memory device 720. In some embodiments, the memory devices 720 may be mounted to one or more memory mezzanines on the bottom side of the chassis-less circuit board substrate 602 and may interconnect with a corresponding processor 820 through a ball-grid array.

Each of the processors 820 includes a heat sink 850 secured thereto. Due to the mounting of the memory devices 720 to the bottom side 750 of the chassis-less circuit board substrate 602 (as well as the vertical spacing of the sleds 400 in the corresponding rack 240), the top side 650 of the chassis-less circuit board substrate 602 includes additional "free" area or space that facilitates the use of heat sinks 850 having a larger size relative to traditional heat sinks used in typical servers. Additionally, due to the improved thermal cooling characteristics of the chassis-less circuit board substrate 602, none of the processor heat sinks 850 include cooling fans attached thereto. That is, each of the heat sinks 850 is embodied as a fan-less heat sink. In some embodiments, the heat sinks 850 mounted atop the processors 820 may overlap with the heat sink attached to the communication circuit 830 in the direction of the airflow path 608 due to their increased size, as illustratively suggested by FIG. 9.

Figure 10:
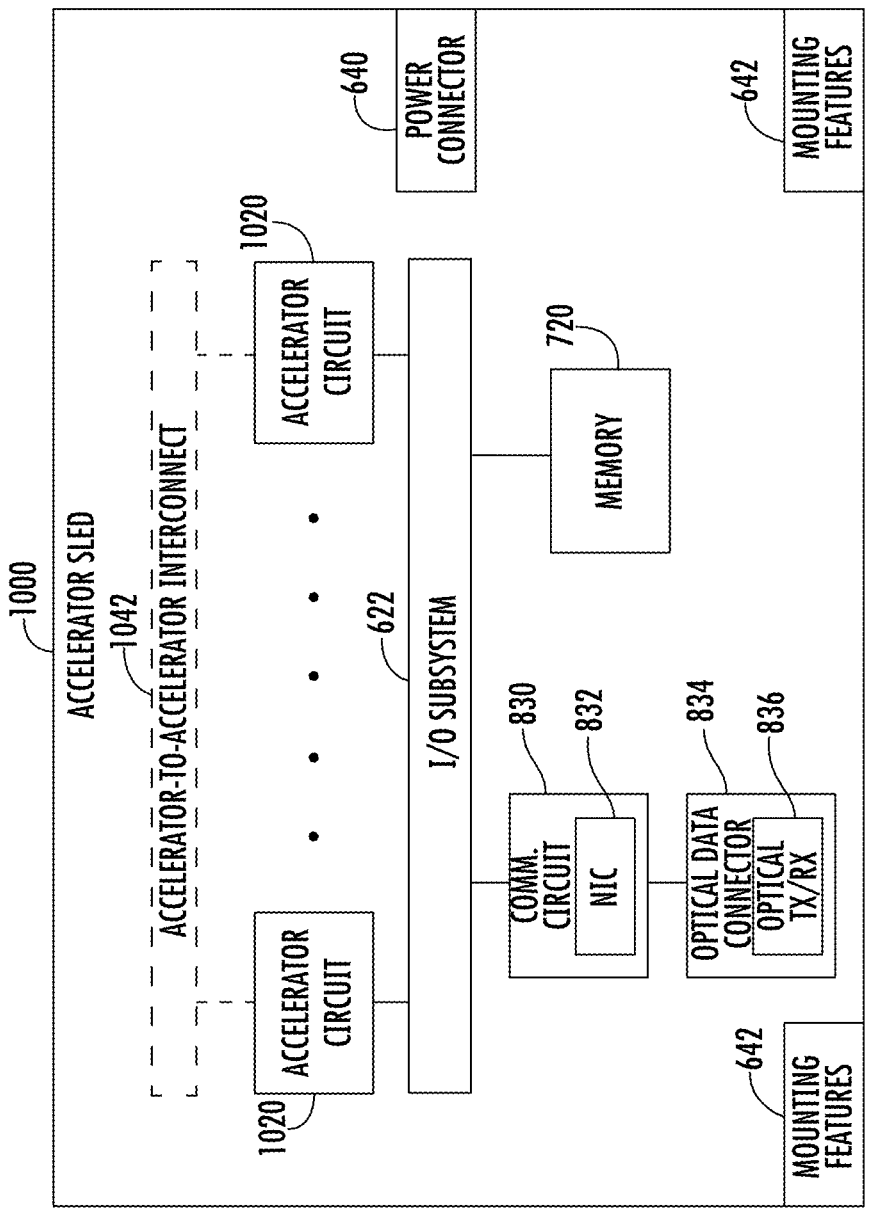
FIG. 10 is a simplified block diagram of at least one embodiment of an accelerator sled usable in the data center of FIG. 1.

Referring now to FIG. 10, in some embodiments, the sled 400 may be embodied as an accelerator sled 1000. The accelerator sled 1000 is configured, to perform specialized compute tasks, such as machine learning, encryption, hashing, or other computational-intensive task. In some embodiments, for example, a compute sled 800 may offload tasks to the accelerator sled 1000 during operation. The accelerator sled 1000 includes various components similar to components of the sled 400 and/or compute sled 800, which have been identified in FIG. 10 using the same reference numbers. The description of such components provided above in regard to FIGS. 6, 7, and 8 apply to the corresponding components of the accelerator sled 1000 and is not repeated herein for clarity of the description of the accelerator sled 1000.

Figure 11:
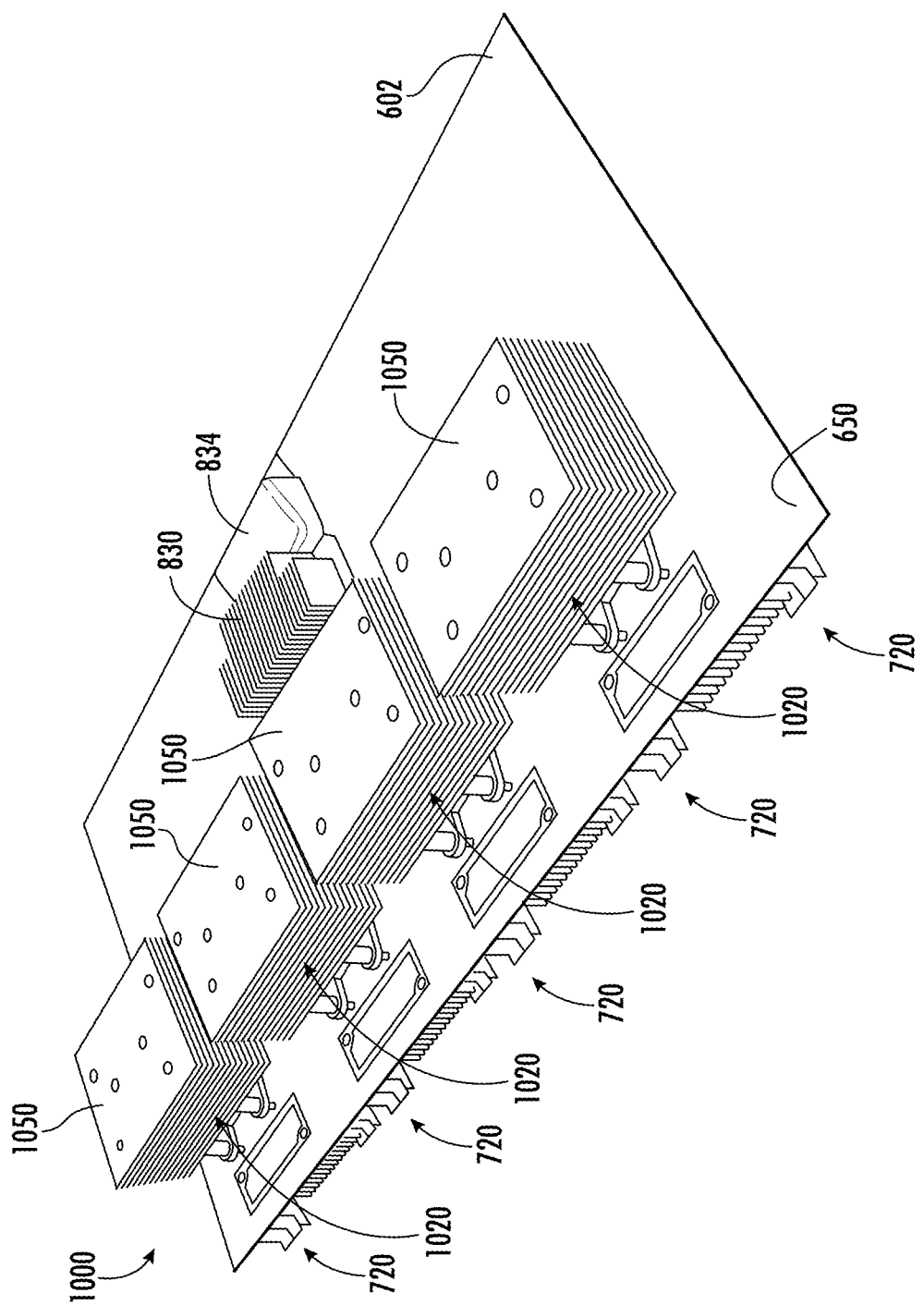
FIG. 11 is a top perspective view of at least one embodiment of the accelerator sled of FIG. 10.

In the illustrative accelerator sled 1000, the physical resources 620 are embodied as accelerator circuits 1020. Although only two accelerator circuits 1020 are shown in FIG. 10, it should be appreciated that the accelerator sled 1000 may include additional accelerator circuits 1020 in other embodiments. For example, as shown in FIG. 11, the accelerator sled 1000 may include four accelerator circuits 1020 in some embodiments. The accelerator circuits 1020 may be embodied as any type of processor, co-processor, compute circuit, or other device capable of performing compute or processing operations. For example, the accelerator circuits 1020 may be embodied as, for example, field programmable gate arrays (FPGA), application-specific integrated circuits (ASICs), security co-processors, graphics processing units (GPUs), neuromorphic processor units, quantum computers, machine learning circuits, or other specialized processors, controllers, devices, and/or circuits.

In some embodiments, the accelerator sled 1000 may also include an accelerator-to-accelerator interconnect 1042. Similar to the resource-to-resource interconnect 624 of the sled 600 discussed above, the accelerator-to-accelerator interconnect 1042 may be embodied as any type of communication interconnect capable of facilitating accelerator-to-accelerator communications. In the illustrative embodiment, the accelerator-to-accelerator interconnect 1042 is embodied as a high-speed point-to-point interconnect (e.g., faster than the I/O subsystem 622). For example, the accelerator-to-accelerator interconnect 1042 may be embodied as a QuickPath Interconnect (QPI), an UltraPath Interconnect (UPI), or other high-speed point-to-point interconnect dedicated to processor-to-processor communications. In some embodiments, the accelerator circuits 1020 may be daisy-chained with a primary accelerator circuit 1020 connected to the NIC 832 and memory 720 through the I/O subsystem 622 and a secondary accelerator circuit 1020 connected to the NIC 832 and memory 720 through a primary accelerator circuit 1020.

Referring now to FIG. 11, an illustrative embodiment of the accelerator sled 1000 is shown. As discussed above, the accelerator circuits 1020, communication circuit 830, and optical data connector 834 are mounted to the top side 650 of the chassis-less circuit board substrate 602. Again, the individual accelerator circuits 1020 and communication circuit 830 are mounted to the top side 650 of the chassis-less circuit board substrate 602 such that no two heat-producing, electrical components shadow each other as discussed above. The memory devices 720 of the accelerator sled 1000 are mounted to the bottom side 750 of the of the chassis-less circuit board substrate 602 as discussed above in regard to the sled 600. Although mounted to the bottom side 750, the memory devices 720 are communicatively coupled to the accelerator circuits 1020 located on the top side 650 via the I/O subsystem 622 (e.g., through vias). Further, each of the accelerator circuits 1020 may include a heat sink 1070 that is larger than a traditional heat sink used in a server. As discussed above with reference to the heat sinks 870, the heat sinks 1070 may be larger than traditional heat sinks because of the "free" area provided by the memory resources 720 being located on the bottom side 750 of the chassis-less circuit board substrate 602 rather than on the top side 650.

Figure 12:
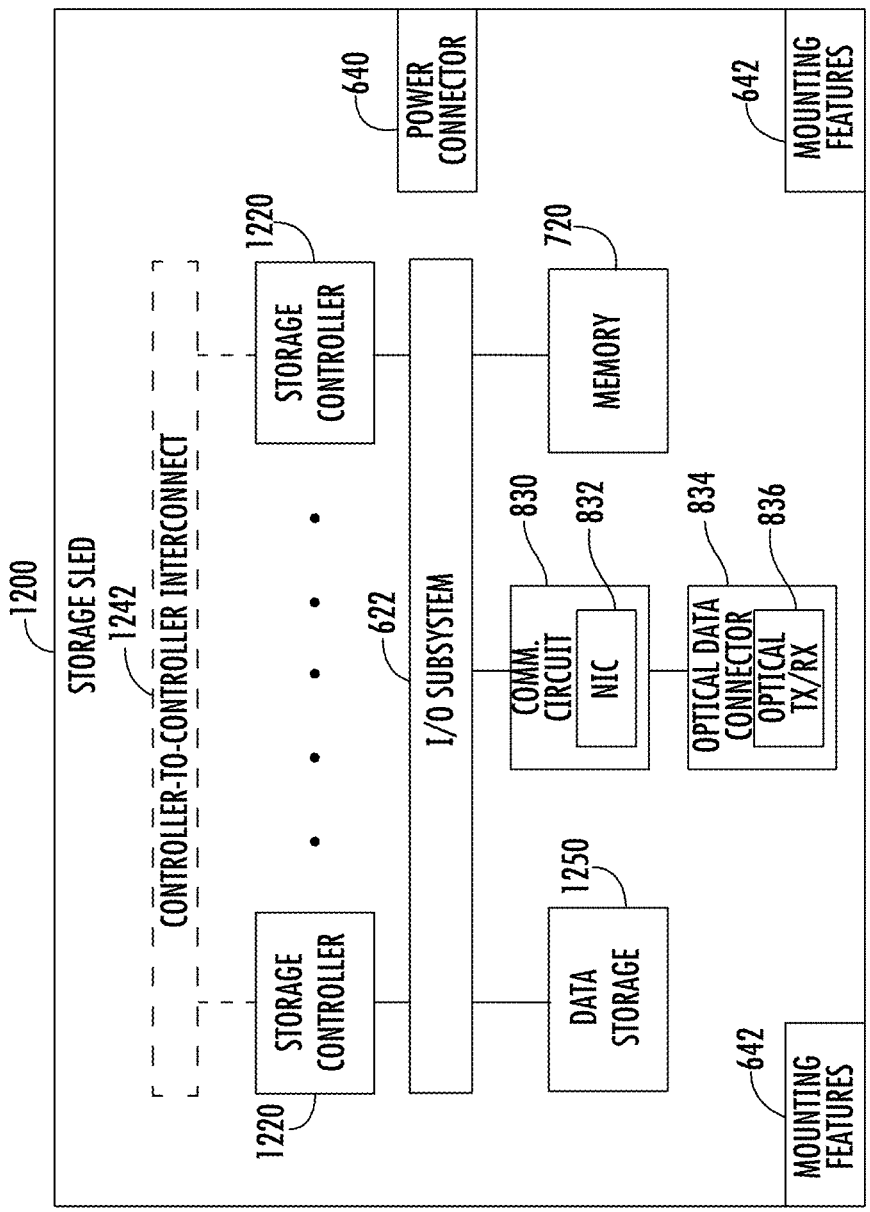
FIG. 12 is a simplified block diagram of at least one embodiment of a storage sled usable in the data center of FIG. 1.

Referring now to FIG. 12, in some embodiments, the sled 400 may be embodied as a storage sled 1200. The storage sled 1200 is configured, to store data in a data storage 1250 local to the storage sled 1200. For example, during operation, a compute sled 800 or an accelerator sled 1000 may store and retrieve data from the data storage 1250 of the storage sled 1200. The storage sled 1200 includes various components similar to components of the sled 400 and/or the compute sled 800, which have been identified in FIG. 12 using the same reference numbers. The description of such components provided above in regard to FIGS. 6, 7, and 8 apply to the corresponding components of the storage sled 1200 and is not repeated herein for clarity of the description of the storage sled 1200.

In the illustrative storage sled 1200, the physical resources 620 are embodied as storage controllers 1220. Although only two storage controllers 1220 are shown in FIG. 12, it should be appreciated that the storage sled 1200 may include additional storage controllers 1220 in other embodiments. The storage controllers 1220 may be embodied as any type of processor, controller, or control circuit capable of controlling the storage and retrieval of data into the data storage 1250 based on requests received via the communication circuit 830. In the illustrative embodiment, the storage controllers 1220 are embodied as relatively low-power processors or controllers. For example, in some embodiments, the storage controllers 1220 may be configured to operate at a power rating of about 75 watts.

In some embodiments, the storage sled 1200 may also include a controller-to-controller interconnect 1242. Similar to the resource-to-resource interconnect 624 of the sled 400 discussed above, the controller-to-controller interconnect 1242 may be embodied as any type of communication interconnect capable of facilitating controller-to-controller communications. In the illustrative embodiment, the controller-to-controller interconnect 1242 is embodied as a high-speed point-to-point interconnect (e.g., faster than the I/O subsystem 622). For example, the controller-to-controller interconnect 1242 may be embodied as a QuickPath Interconnect (QPI), an UltraPath Interconnect (UPI), or other high-speed point-to-point interconnect dedicated to processor-to-processor communications.

Figure 13:
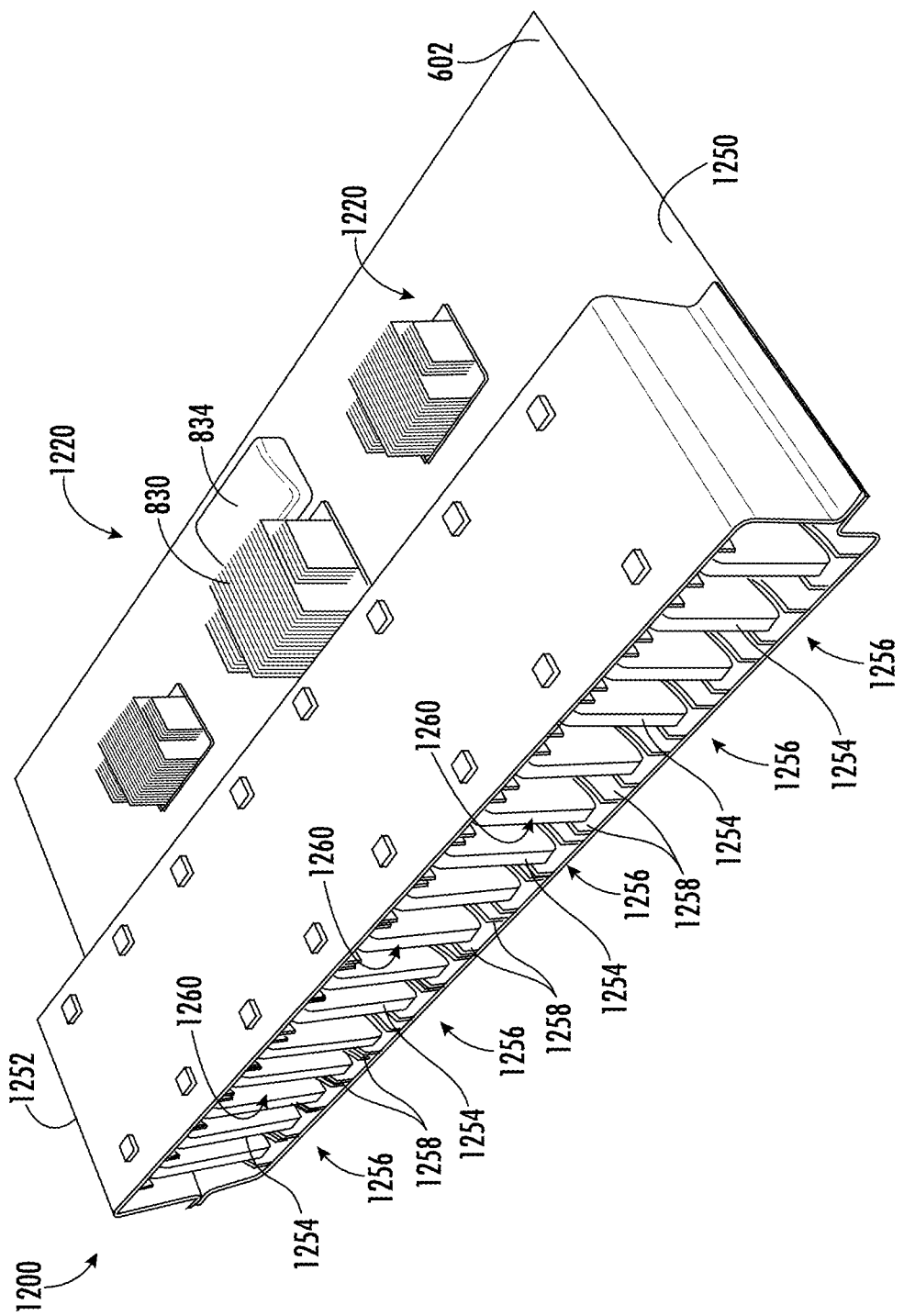
FIG. 13 is a top perspective view of at least one embodiment of the storage sled of FIG. 12.

Referring now to FIG. 13, an illustrative embodiment of the storage sled 1200 is shown. In the illustrative embodiment, the data storage 1250 is embodied as, or otherwise includes, a storage cage 1252 configured to house one or more solid state drives (SSDs) 1254. To do so, the storage cage 1252 includes a number of mounting slots 1256, each of which is configured to receive a corresponding solid state drive 1254. Each of the mounting slots 1256 includes a number of drive guides 1258 that cooperate to define an access opening 1260 of the corresponding mounting slot 1256. The storage cage 1252 is secured to the chassis-less circuit board substrate 602 such that the access openings face away from (i.e., toward the front of) the chassis-less circuit board substrate 602. As such, solid state drives 1254 are accessible while the storage sled 1200 is mounted in a corresponding rack 204. For example, a solid state drive 1254 may be swapped out of a rack 240 (e.g., via a robot) while the storage sled 1200 remains mounted in the corresponding rack 240.

The storage cage 1252 illustratively includes sixteen mounting slots 1256 and is capable of mounting and storing sixteen solid state drives 1254. Of course, the storage cage 1252 may be configured to store additional or fewer solid state drives 1254 in other embodiments. Additionally, in the illustrative embodiment, the solid state drivers are mounted vertically in the storage cage 1252, but may be mounted in the storage cage 1252 in a different orientation in other embodiments. Each solid state drive 1254 may be embodied as any type of data storage device capable of storing long term data. To do so, the solid state drives 1254 may include volatile and nonvolatile memory devices discussed above.

As shown in FIG. 13, the storage controllers 1220, the communication circuit 830, and the optical data connector 834 are illustratively mounted to the top side 650 of the chassis-less circuit board substrate 602. Again, as discussed above, any suitable attachment or mounting technology may be used to mount the electrical components of the storage sled 1200 to the chassis-less circuit board substrate 602 including, for example, sockets (e.g., a processor socket), holders, brackets, soldered connections, and/or other mounting or securing techniques.

As discussed above, the individual storage controllers 1220 and the communication circuit 830 are mounted to the top side 650 of the chassis-less circuit board substrate 602 such that no two heat-producing, electrical components shadow each other. For example, the storage controllers 1220 and the communication circuit 830 are mounted in corresponding locations on the top side 650 of the chassis-less circuit board substrate 602 such that no two of those electrical components are linearly in-line with each other along the direction of the airflow path 608.

The memory devices 720 of the storage sled 1200 are mounted to the bottom side 750 of the of the chassis-less circuit board substrate 602 as discussed above in regard to the sled 400. Although mounted to the bottom side 750, the memory devices 720 are communicatively coupled to the storage controllers 1220 located on the top side 650 via the I/O subsystem 622. Again, because the chassis-less circuit board substrate 602 is embodied as a double-sided circuit board, the memory devices 720 and the storage controllers 1220 may be communicatively coupled by one or more vias, connectors, or other mechanisms extending through the chassis-less circuit board substrate 602. Each of the storage controllers 1220 includes a heat sink 1270 secured thereto. As discussed above, due to the improved thermal cooling characteristics of the chassis-less circuit board substrate 602 of the storage sled 1200, none of the heat sinks 1270 include cooling fans attached thereto. That is, each of the heat sinks 1270 is embodied as a fan-less heat sink.

Figure 14:
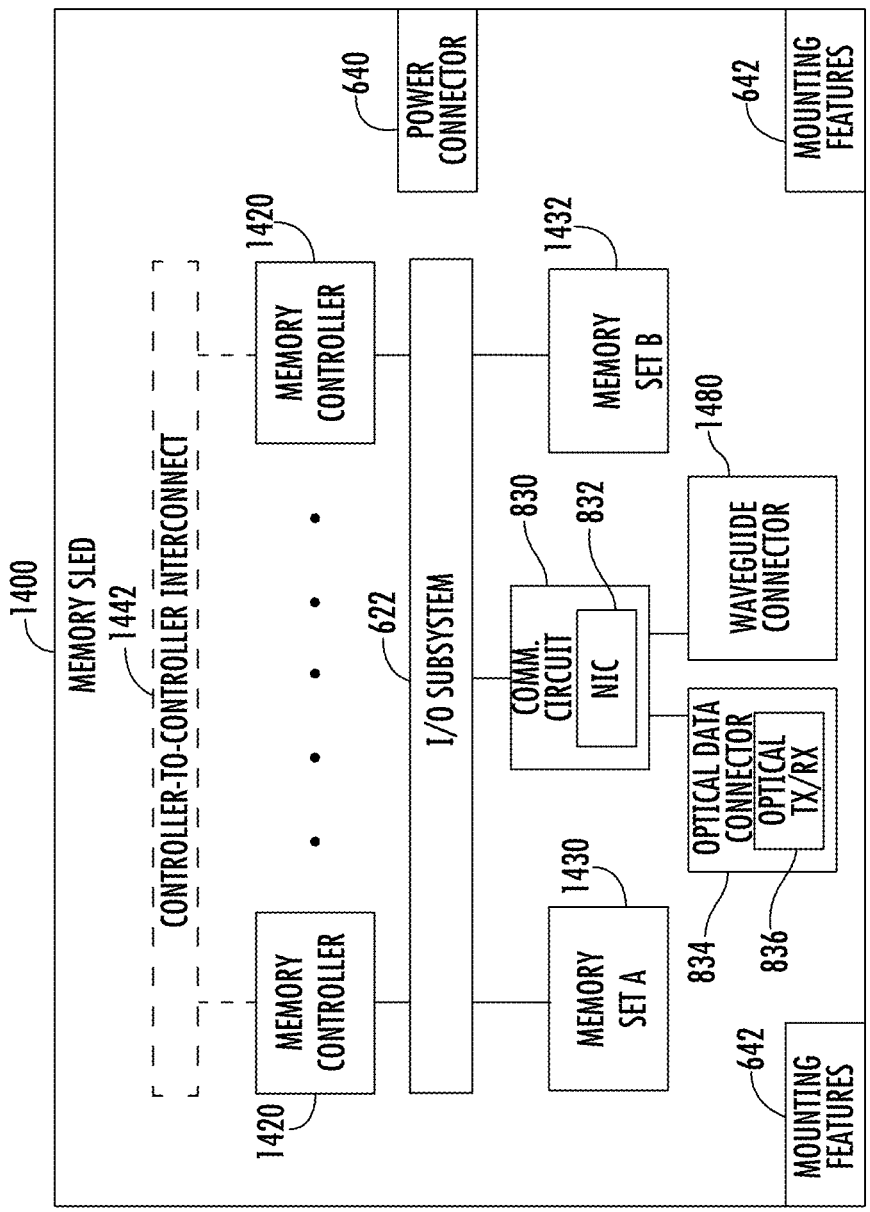
FIG. 14 is a simplified block diagram of at least one embodiment of a memory sled usable in the data center of FIG. 1.

Referring now to FIG. 14, in some embodiments, the sled 400 may be embodied as a memory sled 1400. The storage sled 1400 is optimized, or otherwise configured, to provide other sleds 400 (e.g., compute sleds 800, accelerator sleds 1000, etc.) with access to a pool of memory (e.g., in two or more sets 1430, 1432 of memory devices 720) local to the memory sled 1200. For example, during operation, a compute sled 800 or an accelerator sled 1000 may remotely write to and/or read from one or more of the memory sets 1430, 1432 of the memory sled 1200 using a logical address space that maps to physical addresses in the memory sets 1430, 1432. The memory sled 1400 includes various components similar to components of the sled 400 and/or the compute sled 800, which have been identified in FIG. 14 using the same reference numbers. The description of such components provided above in regard to FIGS. 6, 7, and 8 apply to the corresponding components of the memory sled 1400 and is not repeated herein for clarity of the description of the memory sled 1400.

In the illustrative memory sled 1400, the physical resources 620 are embodied as memory controllers 1420. Although only two memory controllers 1420 are shown in FIG. 14, it should be appreciated that the memory sled 1400 may include additional memory controllers 1420 in other embodiments. The memory controllers 1420 may be embodied as any type of processor, controller, or control circuit capable of controlling the writing and reading of data into the memory sets 1430, 1432 based on requests received via the communication circuit 830. In the illustrative embodiment, each memory controller 1420 is connected to a corresponding memory set 1430, 1432 to write to and read from memory devices 720 within the corresponding memory set 1430, 1432 and enforce any permissions (e.g., read, write, etc.) associated with sled 400 that has sent a request to the memory sled 1400 to perform a memory access operation (e.g., read or write).

In some embodiments, the memory sled 1400 may also include a controller-to-controller interconnect 1442. Similar to the resource-to-resource interconnect 624 of the sled 400 discussed above, the controller-to-controller interconnect 1442 may be embodied as any type of communication interconnect capable of facilitating controller-to-controller communications. In the illustrative embodiment, the controller-to-controller interconnect 1442 is embodied as a high-speed point-to-point interconnect (e.g., faster than the I/O subsystem 622). For example, the controller-to-controller interconnect 1442 may be embodied as a QuickPath Interconnect (QPI), an UltraPath Interconnect (UPI), or other high-speed point-to-point interconnect dedicated to processor-to-processor communications. As such, in some embodiments, a memory controller 1420 may access, through the controller-to-controller interconnect 1442, a memory that is within the memory set 1432 associated with another memory controller 1420. In some embodiments, a scalable memory controller is made of multiple smaller memory controllers, referred to herein as "chiplets", on a memory sled (e.g., the memory sled 1400). The chiplets may be interconnected (e.g., using EMIB (Embedded Multi-Die Interconnect Bridge)). The combined chiplet memory controller may scale up to a relatively large number of memory controllers and I/O ports, (e.g., up to 16 memory channels). In some embodiments, the memory controllers 1420 may implement a memory interleave (e.g., one memory address is mapped to the memory set 1430, the next memory address is mapped to the memory set 1432, and the third address is mapped to the memory set 1430, etc.). The interleaving may be managed within the memory controllers 1420, or from CPU sockets (e.g., of the compute sled 800) across network links to the memory sets 1430, 1432, and may improve the latency associated with performing memory access operations as compared to accessing contiguous memory addresses from the same memory device.

Further, in some embodiments, the memory sled 1400 may be connected to one or more other sleds 400 (e.g., in the same rack 240 or an adjacent rack 240) through a waveguide, using the waveguide connector 1480. In the illustrative embodiment, the waveguides are 64 millimeter waveguides that provide 16 Rx (i.e., receive) lanes and 16 Tx (i.e., transmit) lanes. Each lane, in the illustrative embodiment, is either 16 GHz or 32 GHz. In other embodiments, the frequencies may be different. Using a waveguide may provide high throughput access to the memory pool (e.g., the memory sets 1430, 1432) to another sled (e.g., a sled 400 in the same rack 240 or an adjacent rack 240 as the memory sled 1400) without adding to the load on the optical data connector 834.

Figure 15:
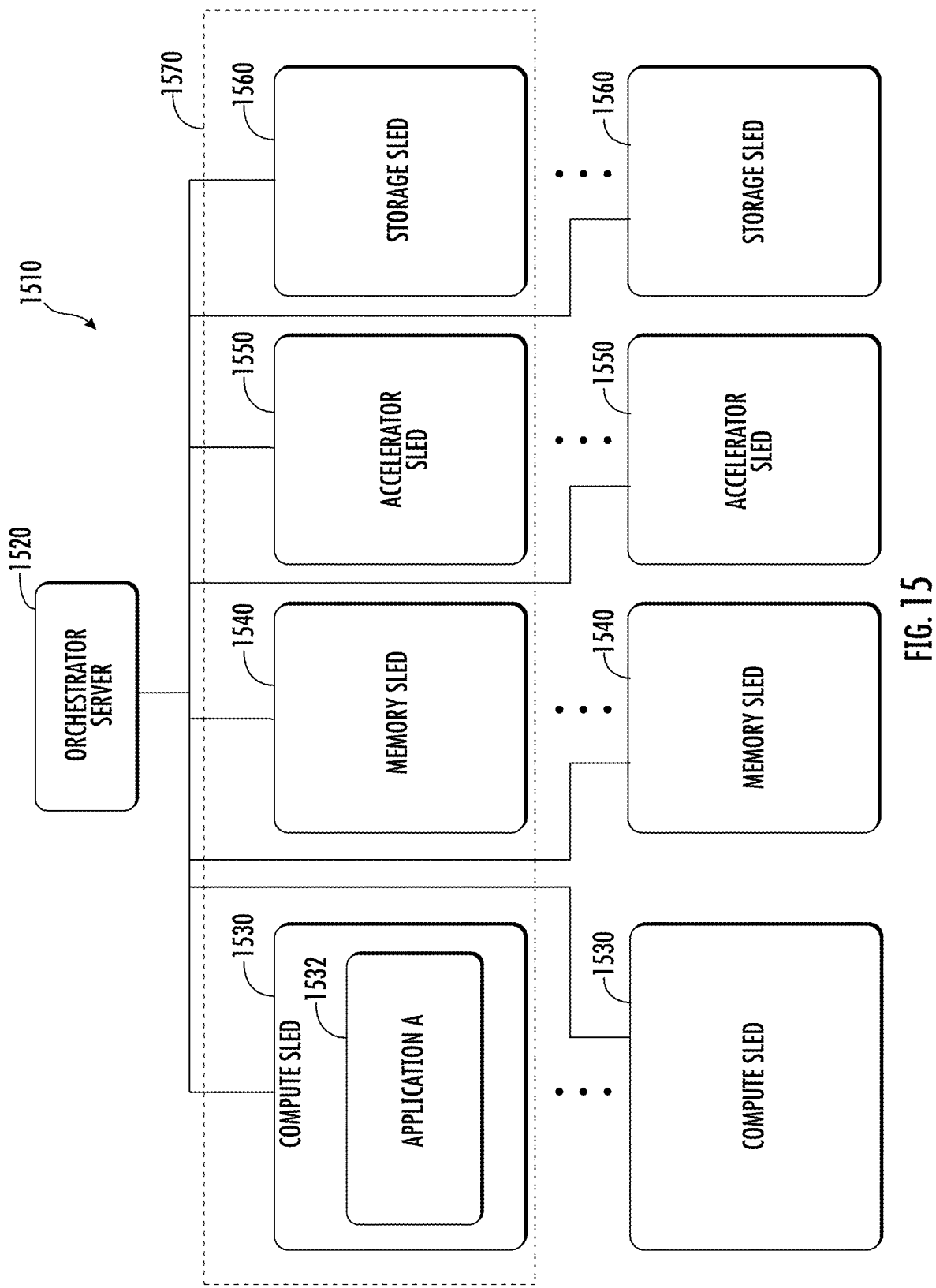
FIG. 15 is a simplified block diagram of a system that may be established within the data center of FIG. 1 to execute workloads with managed nodes composed of disaggregated resources.

Referring now to FIG. 15, a system for executing one or more workloads (e.g., applications) may be implemented in accordance with the data center 100. In the illustrative embodiment, the system 1510 includes an orchestrator server 1520, which may be embodied as a managed node comprising a compute device (e.g., a processor 820 on a compute sled 800) executing management software (e.g., a cloud operating environment, such as OpenStack) that is communicatively coupled to multiple sleds 400 including a large number of compute sleds 1530 (e.g., each similar to the compute sled 800), memory sleds 1540 (e.g., each similar to the memory sled 1400), accelerator sleds 1550 (e.g., each similar to the memory sled 1000), and storage sleds 1560 (e.g., each similar to the storage sled 1200). One or more of the sleds 1530, 1540, 1550, 1560 may be grouped into a managed node 1570, such as by the orchestrator server 1520, to collectively perform a workload (e.g., an application 1532 executed in a virtual machine or in a container). The managed node 1570 may be embodied as an assembly of physical resources 620, such as processors 820, memory resources 720, accelerator circuits 1020, or data storage 1250, from the same or different sleds 400. Further, the managed node may be established, defined, or "spun up" by the orchestrator server 1520 at the time a workload is to be assigned to the managed node or at any other time, and may exist regardless of whether any workloads are presently assigned to the managed node. In the illustrative embodiment, the orchestrator server 1520 may selectively allocate and/or deallocate physical resources 620 from the sleds 400 and/or add or remove one or more sleds 400 from the managed node 1570 as a function of quality of service (QoS) targets (e.g., performance targets associated with a throughput, latency, instructions per second, etc.) associated with a service level agreement for the workload (e.g., the application 1532). In doing so, the orchestrator server 1520 may receive telemetry data indicative of performance conditions (e.g., throughput, latency, instructions per second, etc.) in each sled 400 of the managed node 1570 and compare the telemetry data to the quality of service targets to determine whether the quality of service targets are being satisfied. The orchestrator server 1520 may additionally determine whether one or more physical resources may be deallocated from the managed node 1570 while still satisfying the QoS targets, thereby freeing up those physical resources for use in another managed node (e.g., to execute a different workload). Alternatively, if the QoS targets are not presently satisfied, the orchestrator server 1520 may determine to dynamically allocate additional physical resources to assist in the execution of the workload (e.g., the application 1532) while the workload is executing. Similarly, the orchestrator server 1520 may determine to dynamically deallocate physical resources from a managed node if the orchestrator server 1520 determines that deallocating the physical resource would result in QoS targets still being met.

Additionally, in some embodiments, the orchestrator server 1520 may identify trends in the resource utilization of the workload (e.g., the application 1532), such as by identifying phases of execution (e.g., time periods in which different operations, each having different resource utilizations characteristics, are performed) of the workload (e.g., the application 1532) and pre-emptively identifying available resources in the data center 100 and allocating them to the managed node 1570 (e.g., within a predefined time period of the associated phase beginning). In some embodiments, the orchestrator server 1520 may model performance based on various latencies and a distribution scheme to place workloads among compute sleds and other resources (e.g., accelerator sleds, memory sleds, storage sleds) in the data center 100. For example, the orchestrator server 1520 may utilize a model that accounts for the performance of resources on the sleds 400 (e.g., FPGA performance, memory access latency, etc.) and the performance (e.g., congestion, latency, bandwidth) of the path through the network to the resource (e.g., FPGA). As such, the orchestrator server 1520 may determine which resource(s) should be used with which workloads based on the total latency associated with each potential resource available in the data center 100 (e.g., the latency associated with the performance of the resource itself in addition to the latency associated with the path through the network between the compute sled executing the workload and the sled 400 on which the resource is located).

In some embodiments, the orchestrator server 1520 may generate a map of heat generation in the data center 100 using telemetry data (e.g., temperatures, fan speeds, etc.) reported from the sleds 400 and allocate resources to managed nodes as a function of the map of heat generation and predicted heat generation associated with different workloads, to maintain a target temperature and heat distribution in the data center 100. Additionally or alternatively, in some embodiments, the orchestrator server 1520 may organize received telemetry data into a hierarchical model that is indicative of a relationship between the managed nodes (e.g., a spatial relationship such as the physical locations of the resources of the managed nodes within the data center 100 and/or a functional relationship, such as groupings of the managed nodes by the customers the managed nodes provide services for, the types of functions typically performed by the managed nodes, managed nodes that typically share or exchange workloads among each other, etc.). Based on differences in the physical locations and resources in the managed nodes, a given workload may exhibit different resource utilizations (e.g., cause a different internal temperature, use a different percentage of processor or memory capacity) across the resources of different managed nodes. The orchestrator server 1520 may determine the differences based on the telemetry data stored in the hierarchical model and factor the differences into a prediction of future resource utilization of a workload if the workload is reassigned from one managed node to another managed node, to accurately balance resource utilization in the data center 100.

To reduce the computational load on the orchestrator server 1520 and the data transfer load on the network, in some embodiments, the orchestrator server 1520 may send self-test information to the sleds 400 to enable each sled 400 to locally (e.g., on the sled 400) determine whether telemetry data generated by the sled 400 satisfies one or more conditions (e.g., an available capacity that satisfies a predefined threshold, a temperature that satisfies a predefined threshold, etc.). Each sled 400 may then report back a simplified result (e.g., yes or no) to the orchestrator server 1520, which the orchestrator server 1520 may utilize in determining the allocation of resources to managed nodes.

Figure 16:
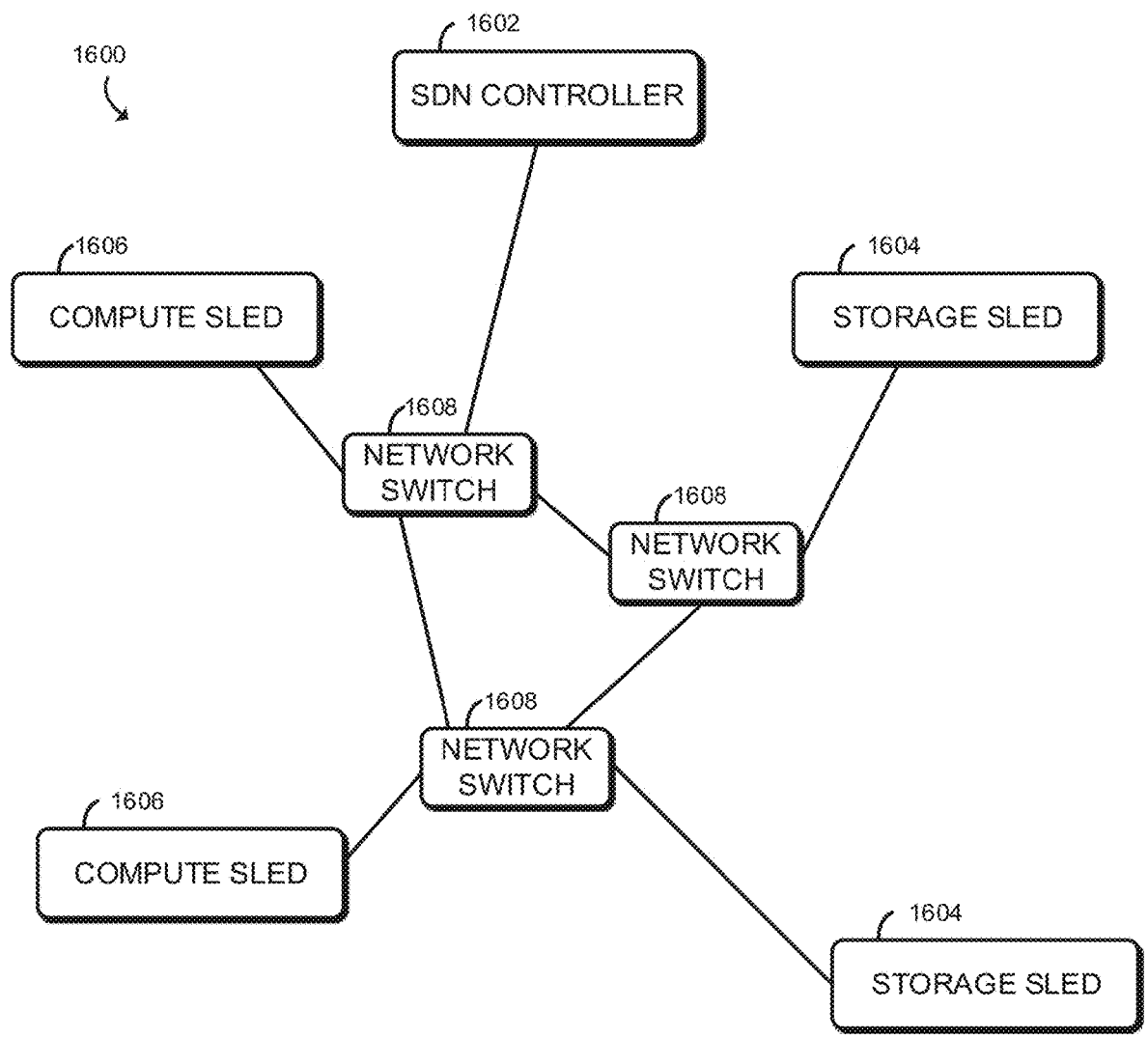
FIG. 16 is a simplified block diagram of a system for managing burst bandwidth requirements.

Referring now to FIG. 16, an illustrative system 1600 for managing burst bandwidth requirements includes a software-defined networking (SDN) controller 1602, one or more storage sleds 1604, one or more compute sleds 1606, and one or more network switches 1608. Each storage sled 1604 includes one or more storage devices 1808, as discussed in more detail below in regard to FIG. 18. The data on each of the storage devices 1808 may be stored in multiple locations (e.g., in three locations), providing redundancy. In use, the SDN controller 1602 monitors the traffic to one or more storage devices of the storage sled 1604. If a failure of one of the storage devices 1808 is detected due to an interruption in traffic, then the data that was stored on that drive is replicated to maintain the desired number of redundancies.

The illustrative SDN controller 1602 manages the bandwidth available for replication of the data that was stored on the storage device 1808 that failed. The SDN controller 1602 may determine how much bandwidth is required during the data replication process. For example, in the illustrative embodiment, the SDN controller 1602 may allocate an initial amount of bandwidth for the data replication process, and then the SDN controller 1602 may increase the amount of bandwidth available several times as the amount of bandwidth needed for the replication increases. Additionally or alternatively, in some embodiments, the SDN controller 1602 may allocate queue resources in the network switches 1608 for the data replication processes.

In some embodiments, the SDN controller 1602 may monitor data traffic on the storage sleds 1604. The SDN controller 1602 may monitor the data traffic for a certain pattern indicating that a future bandwidth burst will be required. For example, in some embodiments, the SDN controller 1602 may determine that several clients are writing sequentially to a single storage sled 1604. The SDN controller 1602 may anticipate that there will be a future bandwidth burst to that storage sled 1604 in response to determining that several clients are writing sequentially. The SDN controller 1602 may then an initial amount of bandwidth for the data transfer, and then the SDN controller 1602 may increase the amount of bandwidth available several times as the amount of bandwidth needed for the data transfer increases. Additionally or alternatively, in some embodiments, the SDN controller 1602 may allocate queue resources in the network switches 1608 for the data transfer.

Figure 17:
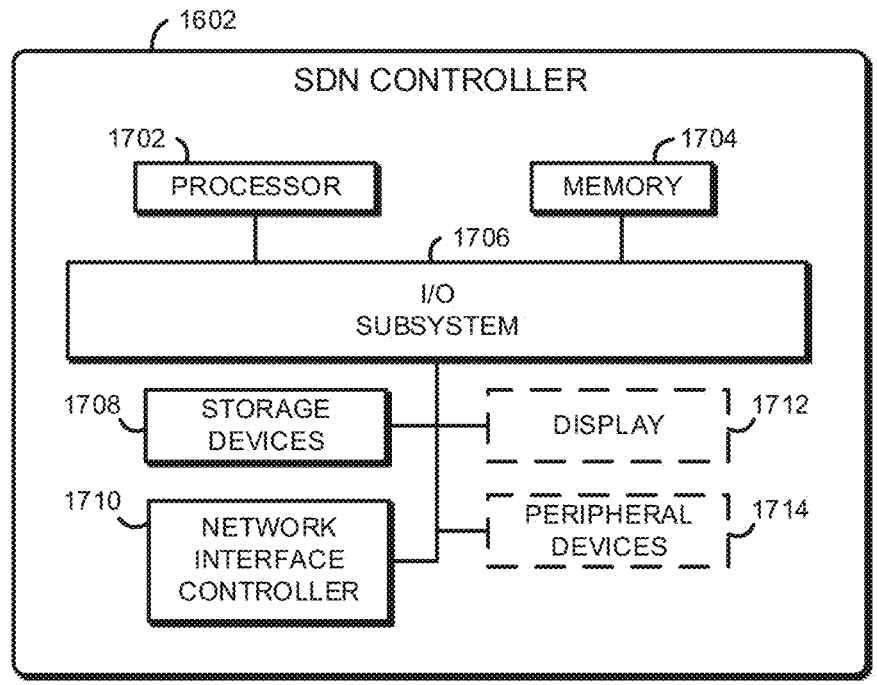
FIG. 17 is a simplified block diagram of a software-defined networking (SDN) controller of the system in FIG. 16.

Referring now to FIG. 17, the SDN controller 1602 may be embodied as any type of compute device capable of managing a software-defined network and performing the functions described herein. For example, the SDN controller 1602 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device. In some embodiments, the SDN controller 1602 may be composed of two or more disaggregated components, such as one or more compute sleds 1606, one or more storage sleds 1604, and/or one or more network switches 1608. The illustrative SDN controller 1602 includes a processor 1702, a memory 1704, an input/output (I/O) subsystem 1706, one or more storage devices 1708, and a network interface controller 1710. In some embodiments, one or more of the illustrative components of the SDN controller 1602 may be incorporated in, or otherwise form a portion of, another component. For example, the memory 1704, or portions thereof, may be incorporated in the processor 1702 in some embodiments.

The processor 1702 may be embodied as any type of processor capable of performing the functions described herein. For example, the processor 1702 may be embodied as a single or multi-core processor(s), a single or multi-socket processor, a digital signal processor, a graphics processor, a microcontroller, or other processor or processing/controlling circuit. Similarly, the memory 1704 may be embodied as any type of volatile or non-volatile memory or data storage capable of performing the functions described herein. In operation, the memory 1704 may store various data and software used during operation of the SDN controller 1602 such as operating systems, applications, programs, libraries, and drivers. The memory 1704 is communicatively coupled to the processor 1702 via the I/O subsystem 1706, which may be embodied as circuitry and/or components to facilitate input/output operations with the processor 1702, the memory 1704, and other components of the SDN controller 1602. For example, the I/O subsystem 1706 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1706 may form a portion of a system-on-a-chip (SoC) and be incorporated, along with the processor 1702, the memory 1704, and other components of the SDN controller 1602 on a single integrated circuit chip.

The one or more storage devices 1708 may be embodied as any type of device or devices configured for the short-term or long-term storage of data. For example, the one or more storage devices 1708 may include any one or more memory devices and circuits, memory cards, hard disk drives, solid-state drives, or other data storage devices.

The network interface controller 1710 may be embodied as any type of interface capable of interfacing the SDN controller 1602 with other compute devices, such as through the one or more network switches 1608. In some embodiments, the network interface controller 1710 may be referred to as a host fabric interface (HFI). The network interface controller 1710 may be capable of interfacing with any appropriate cable type, such as an electrical cable or an optical cable, and/or may be capable of interfacing with a wireless signal, such as through one or more antennae. The network interface controller 1710 may be configured to use any one or more communication technology and associated protocols (e.g., Ethernet, Bluetooth®, WiMAX, near field communication (NFC), etc.). The network interface controller 1710 may be located on silicon separate from the processor 1702, or the network interface controller 1710 may be included in a multi-chip package with the processor 1702, or even on the same die as the processor 1702. The network interface controller 1710 may be embodied as one or more add-in-boards, daughtercards, network interface cards, controller chips, chipsets, specialized components such as a field programmable gate array (FPGA) or application specific integrated circuit (ASIC), or other devices that may be used by the SDN controller 1602 to connect with another compute device. In some embodiments, network interface controller 1710 may be embodied as part of a system-on-a-chip (SoC) that includes one or more processors, or included on a multichip package that also contains one or more processors. In some embodiments, the network interface controller 1710 may include a local processor (not shown) and/or a local memory (not shown) that are both local to the network interface controller 1710. In such embodiments, the local processor of the network interface controller 1710 may be capable of performing one or more of the functions of the processor 1702 described herein. Additionally or alternatively, in such embodiments, the local memory of the network interface controller 1710 may be integrated into one or more components of the SDN controller 1602 at the board level, socket level, chip level, and/or other levels.

In some embodiments, the SDN controller 1602 may include other or additional components, such as those commonly found in a compute device. For example, the SDN controller 1602 may also have a display 1712 and/or peripheral devices 1714. The peripheral devices 1714 may include a keyboard, a mouse, etc. The display 1712 may be embodied as any type of display on which information may be displayed to a user of the SDN controller 1602, such as a touchscreen display, a liquid crystal display (LCD), a light emitting diode (LED) display, a cathode ray tube (CRT) display, a plasma display, an image projector (e.g., 2D or 3D), a laser projector, a heads-up display, and/or other display technology.

Figure 18:
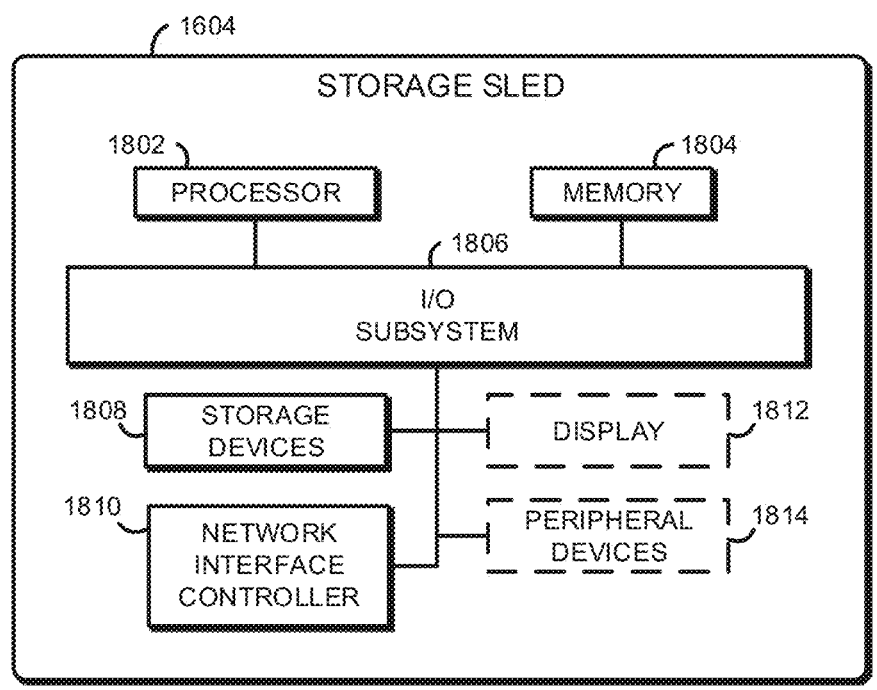
FIG. 18 is a simplified block diagram of a storage sled of the system in FIG. 17.
Figure 19:
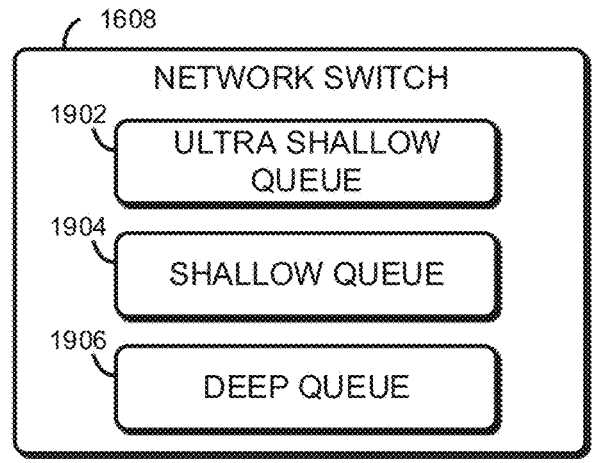
FIG. 19 is a simplified block diagram of a network switch of the system in FIG. 17.

Referring now to FIG. 18, the storage sled 1604 may be embodied as any hardware capable of performing the function described herein. In the illustrative embodiment, the storage sled 1604 is embodied as a sled in a rack of a data center and contains one or more storage devices 1808. Additionally or alternatively, the storage sled 1604 may be embodied as or otherwise be included in, without limitation, a server computer, an embedded computing system, a System-on-a-Chip (SoC), a multiprocessor system, a processor-based system, a consumer electronic device, a smartphone, a cellular phone, a desktop computer, a tablet computer, a notebook computer, a laptop computer, a network device, a router, a switch, a networked computer, a wearable computer, a handset, a messaging device, a camera device, and/or any other computing device.

The storage sled 1604 includes a processor 1802, a memory 1804, an I/O subsystem 1806, the one or more storage devices 1808, a network interface controller 1810, and, optionally, a display 1812 and/or peripheral devices 1814. The processor 1802, the memory 1804, etc. may be similar to the processor 1702, the memory 1704, etc. of the SDN controller 1602, the description of which will not be included in the interest of clarity. Of course, it should be appreciated that, in some embodiments, the components of the storage sled 1604 may differ from the SDN controller 1602 quantitatively or qualitatively. For example, in one embodiment, the SDN controller 1602 may have a relatively small number of storage devices 1708 and/or relatively small amount of storage space, while the storage sled 1604 may have a relatively large number of storage devices 1808 and/or relatively large amount of storage space.

Referring now to FIG. 3, an illustrative network switch 1608 is shown with an ultra-shallow queue 1902, a shallow queue 1904, and a deep queue 1906. Of course, the network switch 1608 may include additional components that are not shown in the interest of clarity, such as one or more ports, a processor, a memory, etc. In use, the network switch 1608 may be configured to store packets in one of the queues 1902, 1904, 1906 based on, e.g., which port the packet is from, what flow the packet is associated with, the source of the packet, the destination of the packet, etc. Each of the ultra-shallow queue 1902, the shallow queue 1904, and the deep queue 1906 may be implemented in hardware, firmware, and/or software. In the illustrative embodiment, the deep queue 1906 may be a virtual queue that is in a shared packet buffer memory.

The network switch 1608 is configured to process packets in the ultra-shallow queue 1902 quickly in order to reduce or minimize the latency of packets placed in the ultra-shallow queue 1902. The network switch 1608 is configured to process packets in shallow queue 1904 quickly as well, although under high load the network switch 1608 may not process packets stored in the shallow queue 1904 as quickly. The network switch 1608 is configured to process packets stored in the deep queues 1906 as network resources are available. In some embodiments, the SDN controller 1602 may assign the various queues 1902, 1904, 1906 to different tasks, such as by assigning the queues 1902, 1904, 1906 to particular flows or particular virtual local area networks (VLANs) (which may be virtual extensible LANs or VXLANs in some embodiments).

Figure 20:
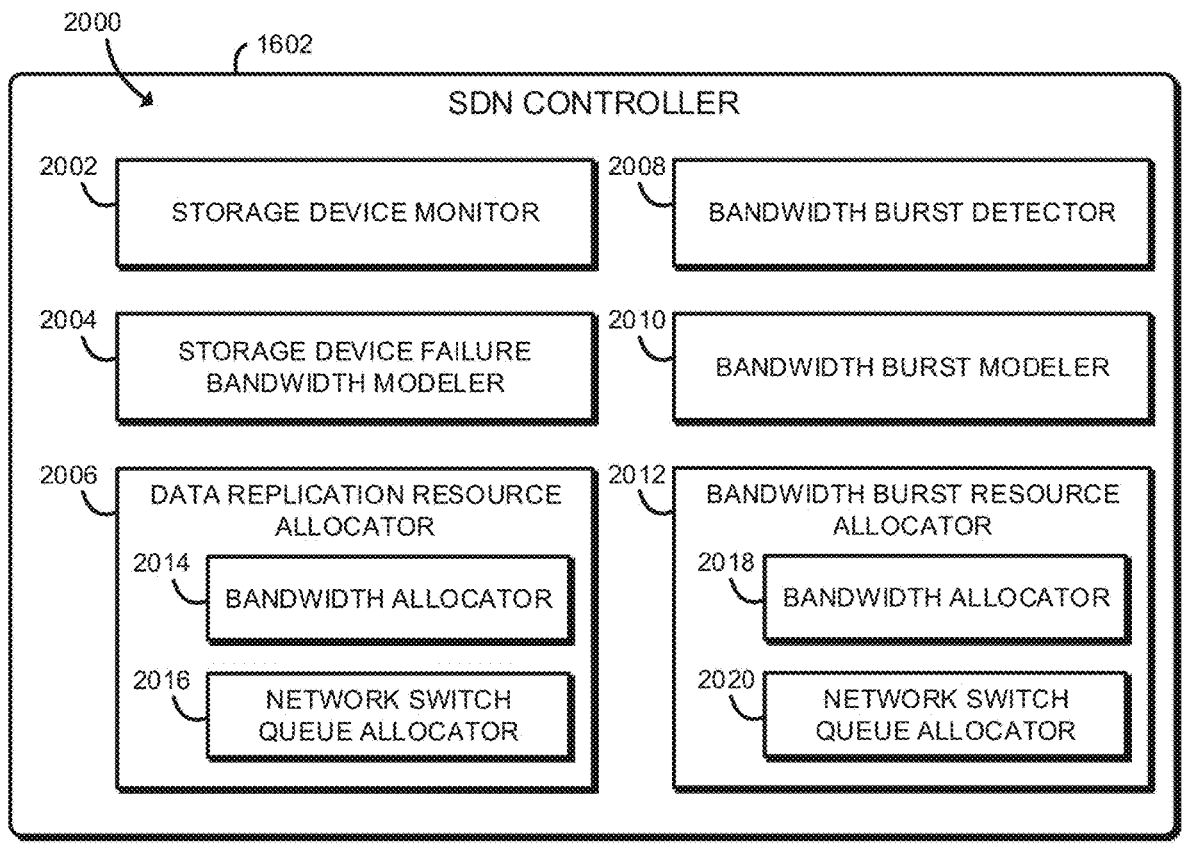
FIG. 20 is a simplified block diagram of an environment that may be established by the SDN controller of FIG. 17.

Referring now to FIG. 20, in an illustrative embodiment, the SDN controller 1602 establishes an environment 2000 during operation. The illustrative environment 2000 includes a storage device monitor 2002, a storage device failure bandwidth modeler 2004, a data replication resource allocator 2006, a bandwidth burst detector 2008, a bandwidth burst modeler 2010, and a bandwidth burst resource allocator 2012. The various modules of the environment 2000 may be embodied as hardware, software, firmware, or a combination thereof. For example, the various modules, logic, and other components of the environment 2000 may form a portion of, or otherwise be established by, the processor 1702 or other hardware components of the SDN controller 1602. As such, in some embodiments, one or more of the modules of the environment 2000 may be embodied as circuitry or collection of electrical devices (e.g., a storage device monitor circuit 2002, a storage device failure bandwidth modeler circuit 2004, a data replication resource allocator circuit 2006, etc.). It should be appreciated that, in such embodiments, one or more of the circuits (e.g., the storage device monitor circuit 2002, the storage device failure bandwidth modeler circuit 2004, the data replication resource allocator circuit 2006, etc.) may form a portion of one or more of the processor 1702, the memory 1704, the I/O subsystem 1706, the storage devices 1708, the network interface controller 1710, and/or other components of the SDN controller 1602. Additionally, in some embodiments, one or more of the illustrative modules may form a portion of another module and/or one or more of the illustrative modules may be independent of one another. Further, in some embodiments, one or more of the modules of the environment 2000 may be embodied as virtualized hardware components or emulated architecture, which may be established and maintained by the processor 1702 or other components of the SDN controller 1602. It should be appreciated that some of the functionality of one or more of the modules of the environment 2000 may require a hardware implementation, in which case embodiments of modules which implement such functionality will be embodied at least partially as hardware.

The storage device monitor 2002, which may be embodied as hardware, firmware, software, virtualized hardware, emulated architecture, and/or a combination thereof as discussed above, is configured to monitor the one or more storage devices 1808 on the one or more storage sleds 1604. The storage device monitor 2002 may monitor the storage devices 1808 for a possible failure. In some embodiments, the storage device monitor 2002 may anticipate a failure of a storage device 1808 prior to the device actually failing, and the storage device monitor 2002 may trigger a data replication process at that time. Additionally or alternatively, the storage device monitor 2002 may monitor for a current failure of a storage device 1808 and may trigger a data replication process at that time. The storage device monitor 2002 may also monitor certain parameters of the storage devices 1808, such as the amount of bandwidth used by or allocated to the storage device 1808, the number of services associated with each storage device 1808, the type of services associated with each storage device 1808, etc.

In some embodiments, the storage device monitor 2002 is configured to monitor the data traffic that is being sent and received at one or more storage sleds 1604 and/or one or more storage devices 1808. The storage device monitor 2002 may monitor for whether data being sent is for sequential writes or random writes. If the storage device monitor 2002 notices a change in data being sent (e.g., several clients are writing sequential writes), the storage device monitor 2002 may anticipate a burst bandwidth for the corresponding storage sled 1604 and/or corresponding storage device 1808 and trigger an allocation of bandwidth accordingly.

The storage device failure bandwidth modeler 2004 is configured to monitor bandwidth usage during data replication after failure of a storage device 1808. The storage device failure bandwidth modeler 2004 may monitor how the bandwidth usage changes over time. In the illustrative embodiment, the storage device failure bandwidth modeler 2004 may observe that the bandwidth used for data replication increases over time. The storage device failure bandwidth modeler 2004 may determine one or more parameters that can be used to model the bandwidth needed for future data replication operations. The one or more parameters may be determined based on, e.g., the amount of bandwidth used by or allocated to the storage device 1808, the number of services associated with the storage device 1808, the type of services associated with the storage device 1808, etc. In some embodiments, the storage device failure bandwidth modeler 2004 may employ machine learning techniques to model bandwidth usage in future data replications. Additionally or alternatively, in some embodiments, the storage device failure bandwidth modeler 2004 may also determine what resources of the network switches 1608 are needed, such as how many queues 1902, 1904, 1906 at what times.

The data replication resource allocator 2006 is configured to allocate resources for data replication of the data stored on a storage device 1808 that has or will fail. The data replication resource allocator 2006 includes a bandwidth allocator 2014 and a network switch queue allocator 2016. The bandwidth allocator 2014 is configured to allocate bandwidth to the replication process. For example, in the illustrative embodiment, the SDN controller 1602 may establish a VLAN (which may be a VXLAN in some embodiments) for use by the data replication process, and the bandwidth allocator 2014 may allocate bandwidth to the VLAN. In the illustrative embodiment, the bandwidth allocator 2014 may increase the bandwidth available to the VLAN in a step-wise manner, increasing the bandwidth allocated in a series of discrete steps. The particular amount of bandwidth to provide and when to increase the bandwidth is determined based on parameters determined by the storage device failure bandwidth modeler 2004. As discussed above, the parameters (and, therefore, the bandwidth allocated) may depend on the bandwidth used by or allocated to the storage device 1808, the number of services associated with the storage device 1808, the type of services associated with the storage device 1808, etc.

The network switch queue allocator 2016 is configured to allocate various queues 1902, 1904, 1906 of the network switches 1608 to the replication process. The network switch queue allocator 2016 may, e.g., request allocation of queues, release queues from other uses, etc. The network switch queue allocator 2016 may determine the amount of queue resources needed and when the queue resources are needed in a similar manner as the bandwidth allocator 2014. For example, the network switch queue allocator 2016 may allocate queue resources of the network switches 1608 based on the parameters of the model constructed by the storage device failure bandwidth modeler 2004.

The bandwidth burst detector 2008 is configured to monitor the storage sleds 1604 and/or the storage devices 1808 for when a burst bandwidth may occur. In particular, the bandwidth burst detector 2008 is configured to monitor for when clients making data requests on the storage sleds 1604 and/or storage devices 1808 change from sequential writs to random writes and/or from random writes to sequential writes. If the bandwidth burst detector 2008 detects several clients changing to sequential writes, the bandwidth burst detector 2008 may anticipate a bandwidth burst and trigger a bandwidth burst allocation process.

The bandwidth burst modeler 2010 is configured to monitor bandwidth of the storage sleds 1604 and/or the storage devices 1808 and generate a model that predicts burst bandwidth usage. The illustrative bandwidth burst modeler 2010 is configured to generate a model that predicts burst bandwidth usage based on the type and number of clients making data requests, whether the data requests are for sequential writes, random writes, or another operation, the bandwidth associated with the storage sled 1606 and/or the storage devices 1808, etc. The bandwidth burst modeler 2010 may generate a model that has a required bandwidth that increases in a series of discrete steps, allowing the bandwidth allocated for the bandwidth burst to increase in a manner that corresponds to the expected demand. Additionally or alternatively, in some embodiments, the bandwidth burst modeler 2010 may also determine what resources of the network switches 1608 are needed, such as how many queues 1902, 1904, 1906 at what times.

The bandwidth burst resource allocator 2012 is configured to provide a burst of resources when triggered by the burst bandwidth detector 2008. The bandwidth burst resource allocator 2012 includes a bandwidth allocator 2018 and a network switch queue allocator 2020. The bandwidth allocator 2018 is configured to allocate bandwidth for the expected burst. For example, in the illustrative embodiment, the SDN controller 1602 may establish a VLAN (which may be a VXLAN in some embodiments) for use by the data transfers associated with the data burst or may increase the bandwidth of the VLANs already associated with the services that are expected to have a burst of bandwidth utilization. In the illustrative embodiment, the bandwidth allocator 2018 may increase the bandwidth available to the VLAN(s) in a step-wise manner, increasing the bandwidth allocated in a series of discrete steps. The particular amount of bandwidth to provide and when to increase the bandwidth is determined based on parameters determined by the bandwidth burst modeler 2010. As discussed above, the parameters (and, therefore, the bandwidth allocated) may depend on the bandwidth used by or allocated to the storage device 1808, the number of services associated with the storage device 1808, the type of services associated with the storage device 1808, how many clients are writing sequentially, how many clients are writing randomly, etc.

The network switch queue allocator 2020 is configured to allocate various queues 1902, 1904, 1906 of the network switches 1608 to handle the expected bandwidth burst. The network switch queue allocator 2020 may, e.g., request allocation of queues, release queues from other uses, etc. The network switch queue allocator 2016 may determine the amount of queue resources needed and when the queue resources are needed in a similar manner as the bandwidth allocator 2018. For example, the network switch queue allocator 2020 may allocate queue resources of the network switches 1608 based on the parameters of the model constructed by the bandwidth burst modeler 2010.

Figure 21:
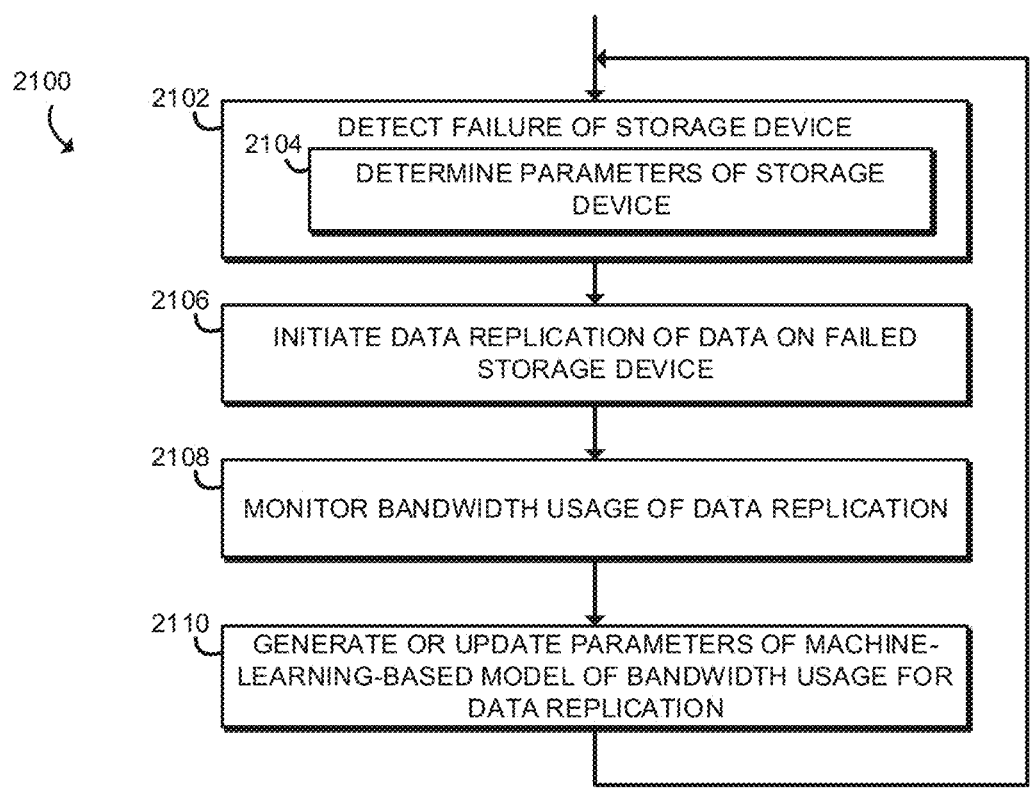
FIG. 21 is a simplified flow diagram of at least one embodiment of a method for determining a model for a burst bandwidth requirement for data replication.

Referring now to FIG. 21, in use, the SDN controller 1602 may execute a method 2100 for generating a model of bandwidth usage in data replication. The method 2100 begins in block 2102, in which the SDN controller 1602 may detect a failure of a storage device 1808. In some embodiments, the SDN controller 1602 may detect a failure of a storage device 1808 prior to the actual failure of the storage device 1808. The SDN controller 1602 may determine parameters of the storage device 1808, such as how much bandwidth is used or assigned to the storage device 1808, the number of services associated with the storage device 1808, etc. In block 2106, the SDN controller 1602 initiates data replication of the data that was stored on the failed storage device 1808.

In block 2108, the SDN controller 1602 monitors the bandwidth usage of the data replication process. In the illustrative embodiment, the bandwidth usage of the data replication process may increase in a predictable manner based on, e.g., how much bandwidth is used or assigned to the storage device 1808, the number of services associated with the storage device 1808, etc.

In block 2110, the SDN controller 1602 may generate parameters of a model (such as a machine-learning-based model) of the bandwidth used for the data replication process. The parameters of the model may be generated based on the observed parameters of the data replication process, such as how much bandwidth was used or assigned to the storage device 1808, the number of services associated with the storage device 1808, the amount of bandwidth used during the data replication process, etc. Of course, in some embodiments, the SDN controller 1602 may continually monitor data replication bandwidth usage, and may update parameters of a model that were previously generated.

Figure 22:
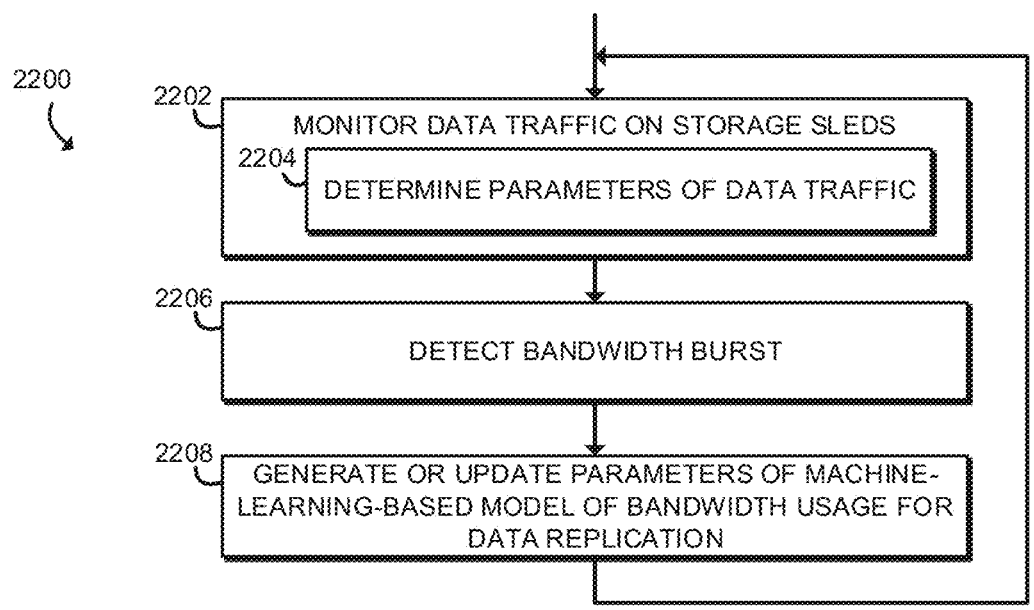
FIG. 22 is a simplified flow diagram of at least one embodiment of a method for determining a model for a burst bandwidth requirement for multiple data accesses.

Referring now to FIG. 22, in use, the SDN controller 1602 may execute a method 2100 for generating a model of bandwidth burst usage. The method 2200 begins in block 2202, in which the SDN controller 1602 may monitor data traffic on storage sleds 1604 and/or storage devices 1808. In block 2204, the SDN controller 1602 may determine parameters of the data traffic, such as the type and number of clients making data requests, whether the data requests are for sequential writes, random writes, or another operation, the bandwidth associated with the storage sled 1606 and/or the storage devices 1808, etc. In block 2206, if the bandwidth associated with the storage sled 1604 and/or storage devices 1808 has a burst, the bandwidth burst is detected in block 2206.

In block 2208, the SDN controller 1602 may generate parameters of a model (such as a machine-learning-based model) of the bandwidth used as part of the bandwidth burst. The parameters of the model may be generated based on the observed parameters of the bandwidth burst, such as such as the type and number of clients making data requests, whether the data requests are for sequential writes, random writes, or another operation, the bandwidth associated with the storage sled 1606 and/or the storage devices 1808, the bandwidth actually used at various times during the burst, etc. Of course, in some embodiments, the SDN controller 1602 may continually burst bandwidth, and may update parameters of a model that were previously generated.

Figure 23:
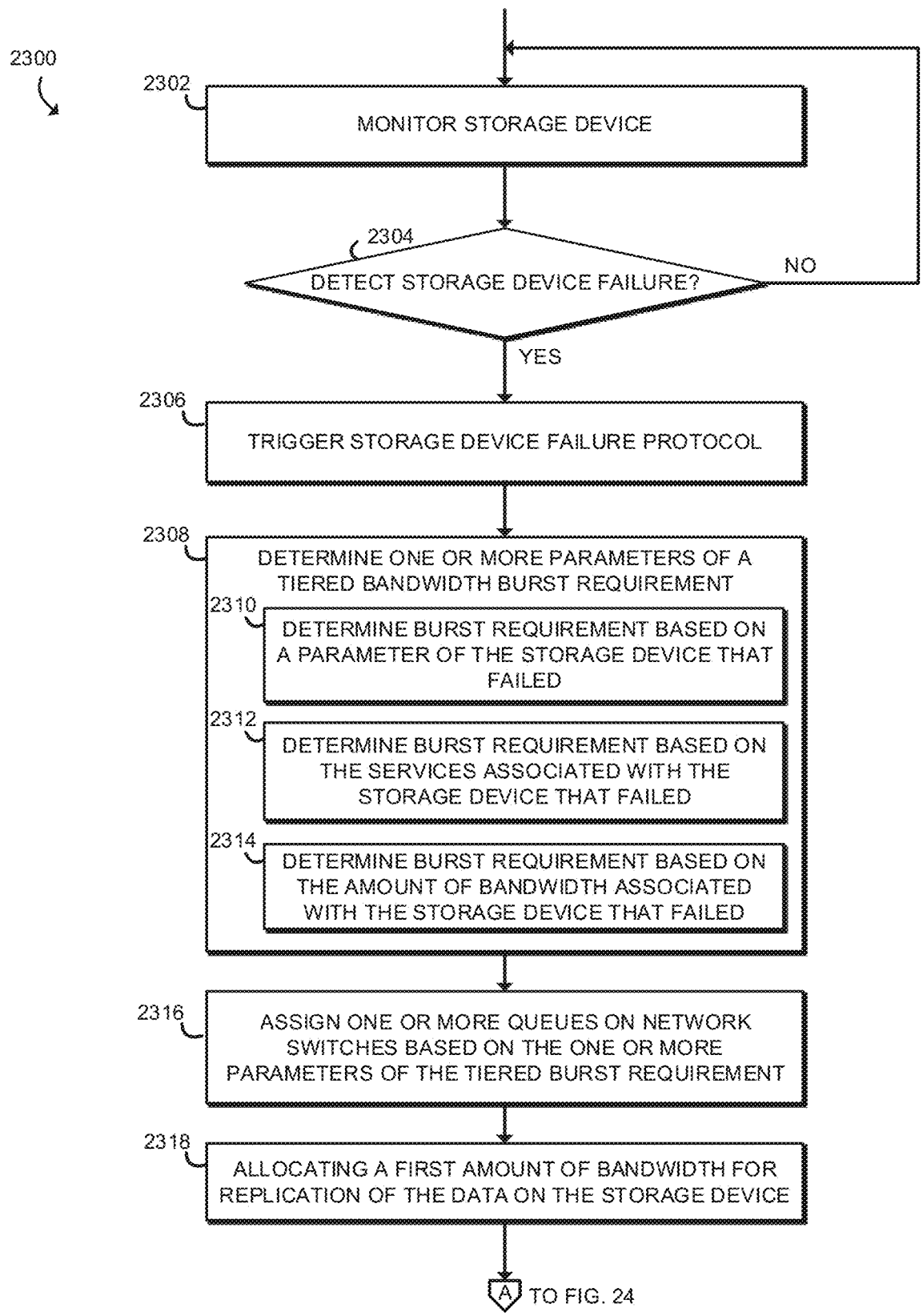
FIGS. 23-24 are a simplified flow diagram of at least one embodiment of a method for managing a burst bandwidth requirement for data replication.

Referring now to FIG. 23, in use, the SDN controller 1602 may execute a method 2300 for controlling bandwidth allocation for a data replication process. The method 2300 begins in block 2302, in which the SDN controller 1602 monitors one or more storage devices 1808 on one or more storage sleds 1604. In block 2304, if failure of a storage device 1808 is not detected, the method loops back to block 2302 to continue monitoring the storage device 1808. If failure of a storage device is detected, the method 2300 proceeds to block 2306. It should be appreciated that, in some embodiments, failure of a storage device 1808 may be detected before the storage device 1808 actually fails.

In block 2306, the SDN controller 1602 triggers a storage device failure protocol. It should be appreciated that, in some embodiments, different aspects of the SDN controller 1602 may be in different locations, and triggering the storage device failure protocol may include, e.g., communicating between various components of the SDN controller 1602 that a failure has occurred.

In block 2308, the SDN controller 1602 determines one or more parameters of a tiered burst requirement to perform the data replication. The parameters of the tiered bandwidth burst requirement may describe the bandwidth that will be allocated for the data replication as a function of time. The parameters of the tiered bandwidth burst requirement may indicate that, e.g., a fixed amount of bandwidth will be allocated initially, that the bandwidth allocated will be increased by a predetermined amount at a predetermined time, etc. The parameters of the tiered bandwidth burst requirement may be determined based on a model that has been generated based on past data replications. In some embodiments, the parameters of the tiered bandwidth burst requirement may be determined based on a machine-learning-based model.

The parameters of the tiered bandwidth burst requirement may be determined based on any suitable data. For example, the parameters of the tiered bandwidth burst requirement may be determined based on a parameter of the storage device 1808 that failed in block 2310. The parameters of the tiered bandwidth burst requirement may be determined based on the services that were associated with the storage device 1808 that failed in block 2312. The parameters of the tiered bandwidth burst requirement may also be determined based on the bandwidth that was associated with the storage device 1808 that failed in block 2314.

In block 2316, the SDN controller 1602 assigns one or more queues 1902, 1904, 1906 of the network switches 1608 to the data replication process. In the illustrative embodiment, the SDN controller 1602 establishes a VLAN (which may be a VXLAN in some embodiments) to be used for the data replication process, and the queues 1902, 1904, 1906 may be assigned to the established VLAN.

In block 2318, the SDN controller 1602 allocates a first amount of bandwidth for replication of the data. The amount allocated is based on the parameters of the tiered bandwidth burst requirement determined in block 2308.

Figure 24:
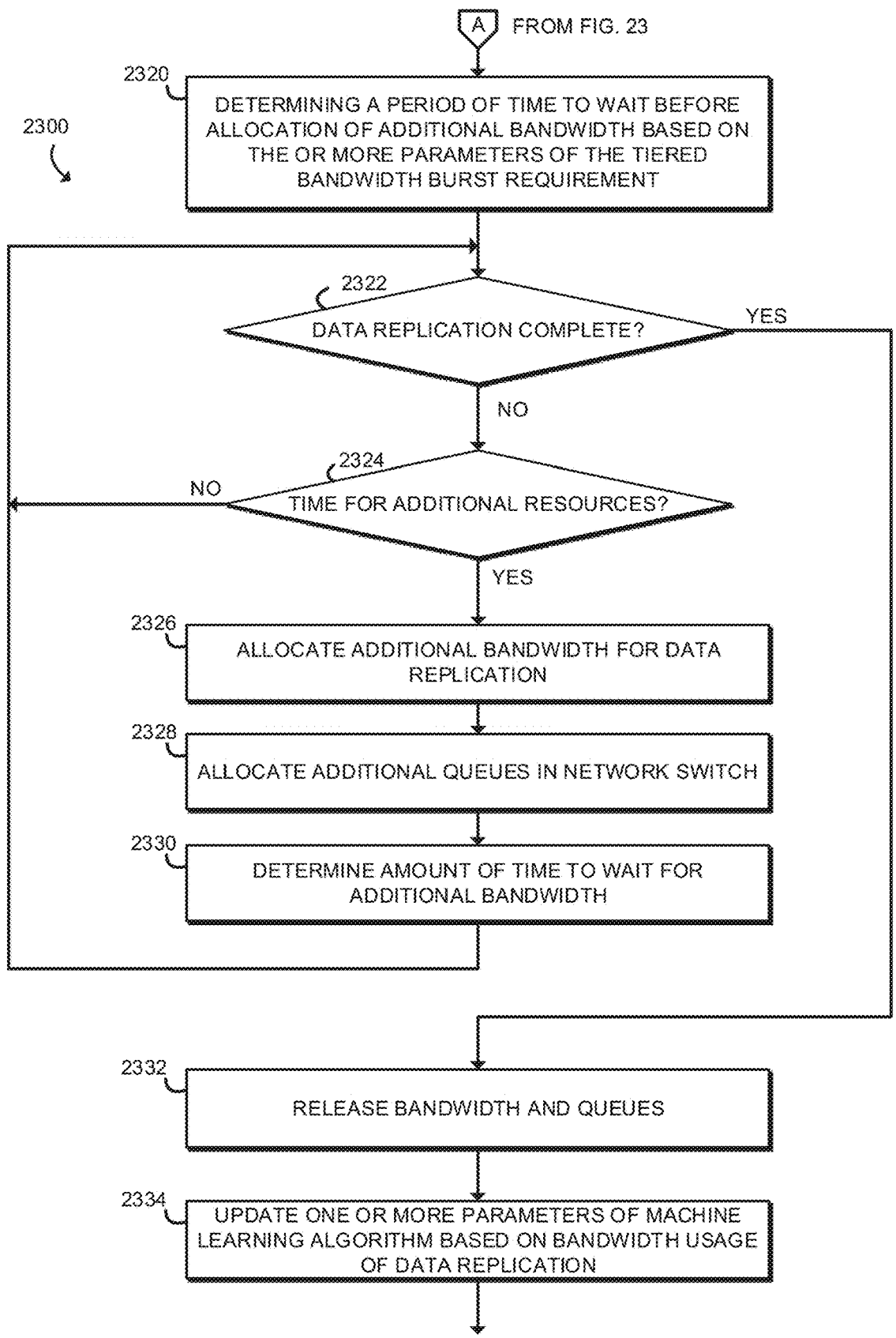

Referring now to FIG. 24, the method 2300 continues in block 2320, in which the SDN controller 1602 determines a period of time to wait before allocating additional bandwidth or queues based on the one or more parameters of the tiered bandwidth burst requirement. The period of time may be any suitable period, such as 1 millisecond, 10 milliseconds, 100 milliseconds, 1 second, 10 seconds, etc. In some embodiments, the SDN controller 1602 may determine when to allocate additional bandwidth based on how much of the currently-allocated bandwidth is in use. In block 2322, if the data replication process is complete, the method 2300 jumps to block 2332, in which the SDN controller 1602 releases the bandwidth and queues allocated to the data replication. If the data replication process is not complete, the method 2300 proceeds to block 2324.

In block 2324, if it is not yet time to allocate additional resources, the method 2300 loops back to block 2322 to check if data replication is complete. If it is time to allocate additional resources, the method 2300 proceeds to block 2326, in which the SDN controller 1602 allocates additional bandwidth for data replication. The additional amount to allocate may be determined based on the parameters of the tiered bandwidth burst requirement determined in block 2308. In the illustrative embodiment, the amount to increase the bandwidth by may be determined at the beginning of the data replication process. Additionally or alternatively, the amount to increase the bandwidth by may be partially determined based on aspects of the data replication process as it is ongoing.

In block 2328, the SDN controller 1602 may also allocate additional queues 1902, 1904, 1906 of the network switches 1608 to the data replication process. In block 2330, the SDN controller 1602 may determine an amount of time to wait before adding additional bandwidth. It should be appreciated that, in some embodiments, the SDN controller 1602 may determine how long to wait after each bandwidth addition at the beginning of the data replication process. Additionally or alternatively, how long to wait for the next increase in bandwidth may be partially determined based on aspects of the data replication process as it is ongoing.

Referring back to block 2322, when the data replication is complete, the method jumps to block 2332, in which the SDN controller 1602 releases the bandwidth and the queues allocated to the data replication process. In block 2334, the SDN controller 1602 may update one or more parameters of a machine-learning-based algorithm that models the bandwidth usage of data replication based on the bandwidth actually used during the data replication.

Figure 25:
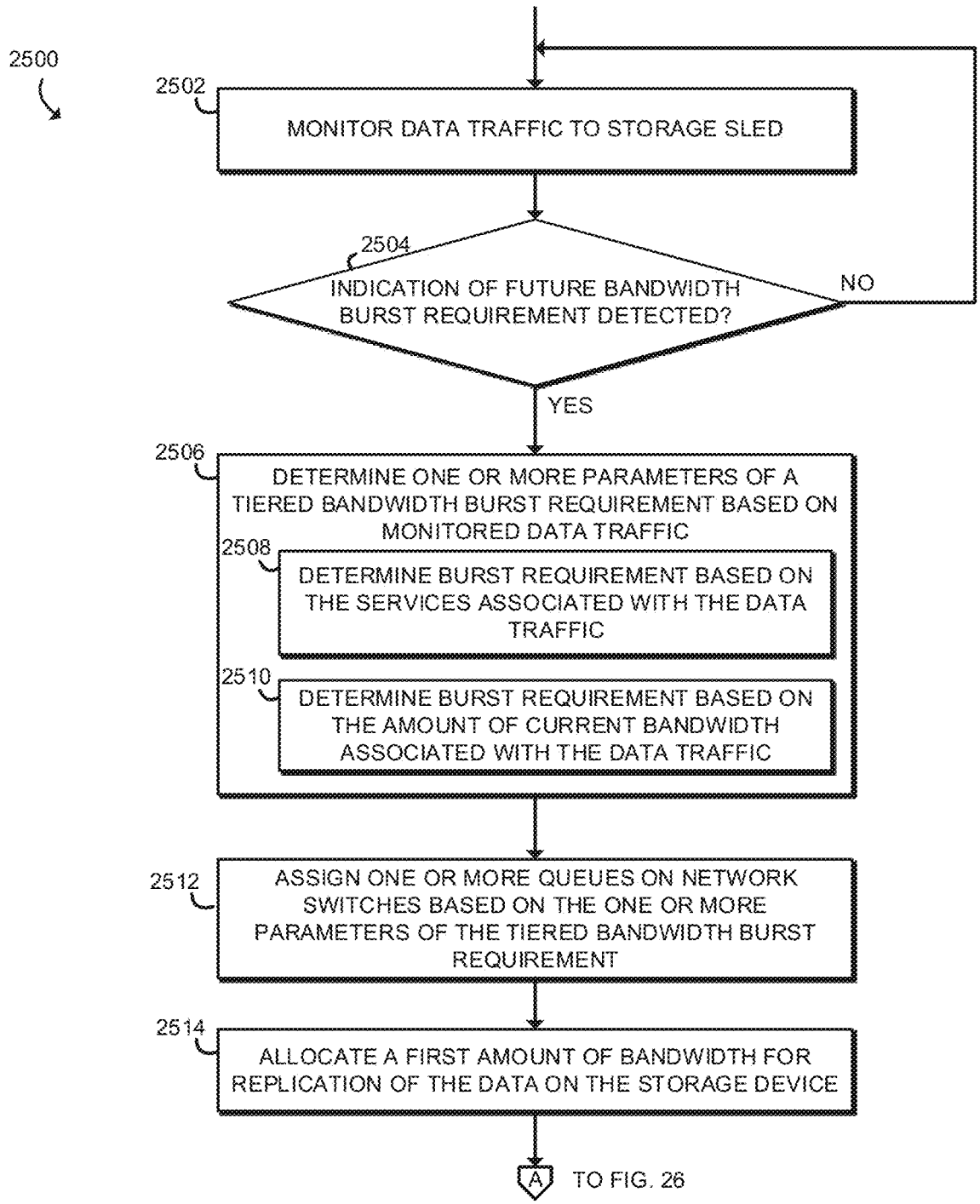
FIGS. 25-26 are a simplified flow diagram of at least one embodiment of a method for managing a burst bandwidth requirement for multiple data accesses.

Referring now to FIG. 25, in use, the SDN controller 1602 may execute a method 2500 for controlling bandwidth allocation for a bandwidth burst. The method 2500 begins in block 2502, in which the SDN controller 1602 monitors data traffic on one or more storage sleds 1604 and/or one or more storage devices 1808. The SDN controller 1602 may monitor for an indication of a future bandwidth burst requirement, such as several clients all sending sequential writes to the same storage sled 1604 and/or to the same storage device 1808.

In block 2504, if an indication of a future bandwidth burst requirement is not detected, the method loops back to block 2502 to continue monitoring the storage sleds 1604 and/or the storage devices 1808. If indication of a future bandwidth burst requirement is detected, the method 2500 proceeds to block 2506.

In block 2506, the SDN controller 1602 determines one or more parameters of a tiered bandwidth burst requirement based on the monitored data traffic. The parameters of the tiered bandwidth burst requirement may describe the bandwidth that will be allocated to handle the anticipated bandwidth burst as a function of time. The parameters of the tiered bandwidth burst requirement may indicate that, e.g., a fixed amount of bandwidth will be allocated initially, that the bandwidth allocated will be increased by a predetermined amount at a predetermined time, etc. The parameters of the tiered bandwidth burst requirement may be determined based on a model that has been generated based on past bandwidth bursts. In some embodiments, the parameters of the tiered bandwidth burst requirement may be determined based on a machine-learning-based model.

The parameters of the tiered bandwidth burst requirement may be determined based on any suitable data. In the illustrative embodiment, the parameters of the tiered bandwidth burst requirement may be determined based on the number of clients that are providing sequential writes. Additionally or alternatively, in some embodiments, the parameters of the tiered bandwidth burst requirement may be determined based on the type or number of services associated with the monitored data traffic in block 2508. The parameters of the tiered bandwidth burst requirement may also be determined based on the amount of current bandwidth associated with the monitored data traffic in block 2510.

In block 2512, the SDN controller 1602 assigns one or more queues 1902, 1904, 1906 of the network switches 1608 to the anticipated bandwidth burst. In the illustrative embodiment, the SDN controller 1602 may establish a new VLAN or may determine a VLAN associated with the bandwidth burst (which may be VXLANs in some embodiments), and the queues 1902, 1904, 1906 may be assigned to the established VLAN.

In block 2514, the SDN controller 1602 allocates a first amount of bandwidth for the anticipated bandwidth burst. The amount allocated is based on the parameters of the tiered bandwidth burst requirement determined in block 2506.

Figure 26:
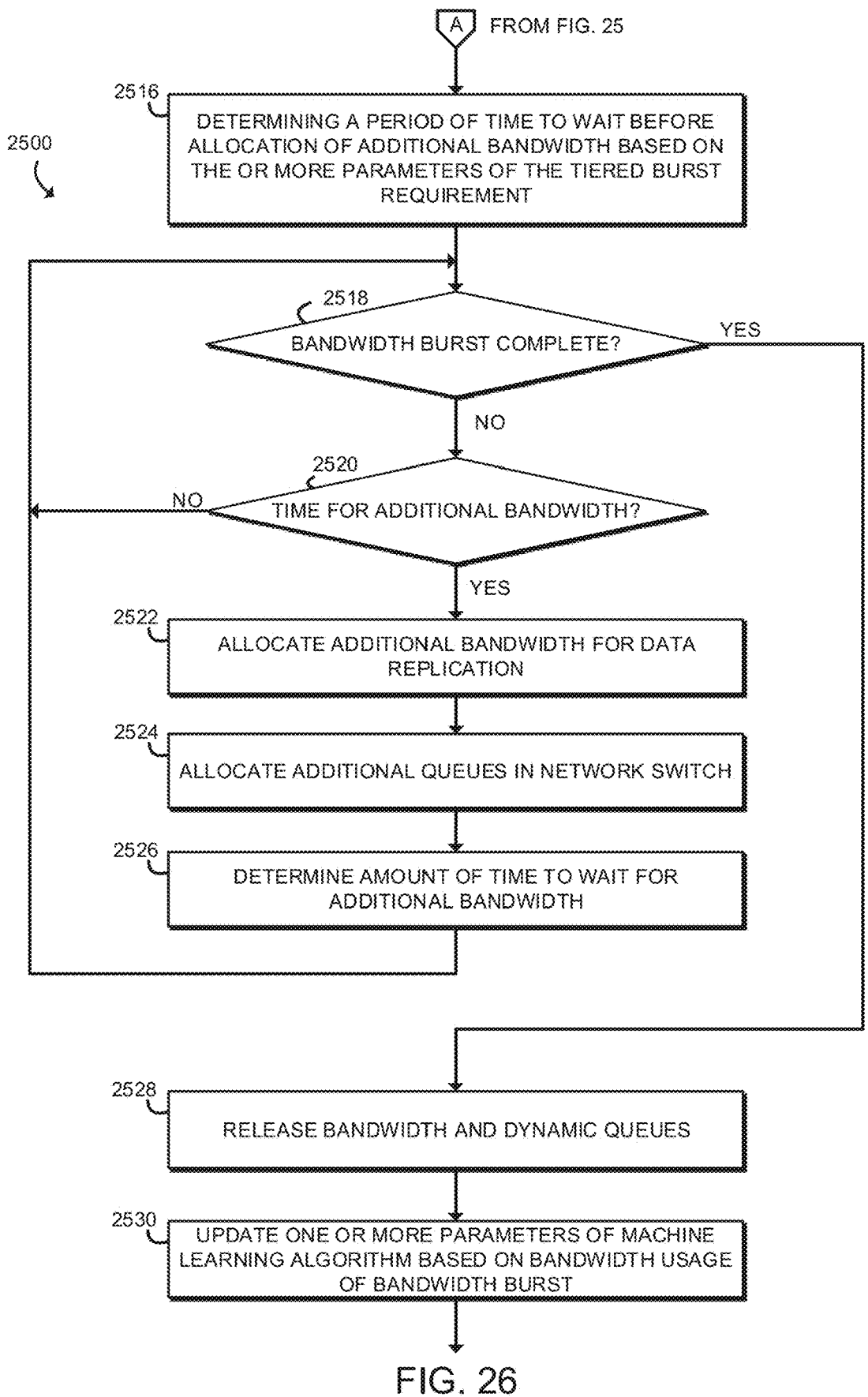

Referring now to FIG. 26, the method 2500 continues in block 2516, in which the SDN controller 1602 determines a period of time to wait before allocating additional bandwidth or queues based on the one or more parameters of the tiered bandwidth burst requirement. The period of time may be any suitable period, such as 1 millisecond, 10 milliseconds, 100 milliseconds, 1 second, 10 seconds, etc. In some embodiments, the SDN controller 1602 may determine when to allocate additional bandwidth based on how much of the currently-allocated bandwidth is in use. In block 2518, if the bandwidth burst is complete, the method 2500 jumps to block 2528, in which the SDN controller 1602 releases the bandwidth and queues allocated to for the bandwidth burst. If the data replication process is not complete, the method 2500 proceeds to block 2520.

In block 2520, if it is not yet time to allocate additional resources, the method 2500 loops back to block 2518 to check if the bandwidth burst is complete. If it is time to allocate additional resources, the method 2500 proceeds to block 2522, in which the SDN controller 1602 allocates additional bandwidth for the bandwidth burst. The additional amount to allocate may be determined based on the parameters of the tiered bandwidth burst requirement determined in block 2508. In the illustrative embodiment, the amount to increase the bandwidth by may be determined at the beginning of the data replication process. Additionally or alternatively, the amount to increase the bandwidth by may be partially determined based on aspects of the bandwidth burst as it is ongoing.

In block 2524, the SDN controller 1602 may also allocate additional queues 1902, 1904, 1906 of the network switches 1608 for the bandwidth burst. In block 2526, the SDN controller 1602 may determine an amount of time to wait before adding additional bandwidth. It should be appreciated that, in some embodiments, the SDN controller 1602 may determine how long to wait after each bandwidth addition at the beginning of the bandwidth burst. Additionally or alternatively, how long to wait for the next increase in bandwidth may be partially determined based on aspects of the bandwidth burst as it is ongoing.

Referring back to block 2518, when the data replication is complete, the method jumps to block 2528, in which the SDN controller 1602 releases the bandwidth and the queues allocated for the bandwidth burst. In block 2530, the SDN controller 1602 may update one or more parameters of a machine-learning-based algorithm that models the bandwidth usage of the bandwidth burst based on the bandwidth actually used during the bandwidth burst.

EXAMPLES

Illustrative examples of the devices, systems, and methods disclosed herein are provided below. An embodiment of the devices, systems, and methods may include any one or more, and any combination of, the examples described below.

Example 1 includes a software-defined networking (SDN) controller for control of data transfer, the SDN controller comprising storage device monitor circuitry to detect a failure of a storage device of a storage sled of a data center; and a data replication resource allocator to determine one or more parameters of a tiered bandwidth burst requirement for replication of data that was on the storage device; allocate a first amount of bandwidth on a network of the data center for replication of the data that was on the storage device; determine, based on the one or more parameters of the tiered bandwidth burst requirement, a period of time to wait before allocation of additional bandwidth for replication of the data that was on the storage device; and allocate a second amount of bandwidth on the network for replication of data that was on the storage device in response to a determination that the period of time to wait has elapsed.

Example 2 includes the subject matter of Example 1, and wherein the data replication resource allocator is further to establish a virtual local area network (VLAN) on the network, wherein to allocate the first amount of bandwidth comprises to allocate the first amount of bandwidth for replication of the data on the storage device to the VLAN, wherein to allocate the second amount of bandwidth comprises to allocate the second amount of bandwidth for replication of the data on the storage device to the VLAN.

Example 3 includes the subject matter of any of Examples 1 and 2, and wherein to determine the period of time to wait before allocation of the additional bandwidth comprises to determine the period of time to wait before allocation of the additional bandwidth prior to allocation of the first amount of bandwidth, wherein the data replication resource allocator is further to determine the second amount of bandwidth prior to allocation of the first amount of bandwidth.

Example 4 includes the subject matter of any of Examples 1-3, and wherein the data replication resource allocator is further to determine the first amount of bandwidth to be allocated based on one or more parameters of the storage device; determine the period of time to wait based on the one or more parameters of the storage device; and determine the second amount of bandwidth to be allocated based on the one or more parameters of the storage device.

Example 5 includes the subject matter of any of Examples 1-4, and wherein the one or more parameters of the storage device comprise at least one of (i) a number of services associated with the storage device, (ii) a type of storage associated with the storage device, and (iii) a bandwidth associated with the storage device.

Example 6 includes the subject matter of any of Examples 1-5, and wherein the data replication resource allocator is further to access one or more parameters of a machine-learning-based algorithm, wherein to determine the first amount of bandwidth to be allocated comprises to determine the first amount of bandwidth to be allocated with use of the one or more parameters of the machine learning-based algorithm, wherein to determine the period of time to wait comprises to determine the period of time to wait with use of the one or more parameters of the machine learning-based algorithm, and wherein to determine the second amount of bandwidth to be allocated comprises to determine the second amount of bandwidth to be allocated with use of the one or more parameters of the machine learning-based algorithm.

Example 7 includes the subject matter of any of Examples 1-6, and further including a storage device failure bandwidth modeler to monitor bandwidth usage of a plurality of data replication processes resulting from failure of a plurality of storage devices; determine parameters of the plurality of storage devices; determine the one or more parameters of the machine-learning-based algorithm based on the monitored bandwidth usage of the plurality of data replication processes and the determined parameters of the plurality of storage devices.

Example 8 includes the subject matter of any of Examples 1-7, and wherein the data replication resource allocator is further to allocate a first number of queues of one or more network switches for replication of the data on the storage device; and allocate a second number of queues of the one or more network switches for replication of the data in response to the determination that the period of time to wait has elapsed, wherein the second number of queues to be allocated is predetermined prior to allocation of the first number of queues.

Example 9 includes a software-defined networking (SDN) controller for control of data transfer, the SDN controller comprising storage device monitor circuitry to monitor data traffic from each of a plurality of compute device to a storage sled of a data center over a network of the data center; bandwidth burst detector circuitry to detect an indication of a future bandwidth burst based on the data traffic from each of the plurality of compute devices; and bandwidth burst resource allocator circuitry to determine one or more parameters of a tiered bandwidth burst requirement based on the data traffic from each of the plurality of compute devices; allocate a first amount of bandwidth on the network for data transfer from each of the plurality of compute devices based on the determined one or more parameters of the tiered bandwidth burst requirement; determine, based on the one or more parameters of the tiered bandwidth burst requirement, a period of time to wait before allocation of additional bandwidth for data transfer from each of the plurality of compute devices; and allocate a second amount of bandwidth on the network for the data transfer from each of the plurality of compute devices in response to a determination that the period of time to wait has elapsed.

Example 10 includes the subject matter of Example 9, and wherein to allocate the first amount of bandwidth comprises to allocate the first amount of bandwidth to a VLAN associated with data transfer from each of the plurality of compute devices, wherein to allocate the second amount of bandwidth comprises to allocate the second amount of bandwidth to the VLAN associated with data transfer from each of the plurality of compute devices.

Example 11 includes the subject matter of any of Examples 9 and 10, and wherein to determine the period of time to wait before allocation of the additional bandwidth comprises to determine the period of time to wait before allocation of the additional bandwidth prior to allocation of the first amount of bandwidth, wherein the bandwidth burst resource allocator circuitry is further to determine the second amount of bandwidth prior to allocation of the first amount of bandwidth.

Example 12 includes the subject matter of any of Examples 9-11, and wherein to detect the indication of the future bandwidth burst based on the data traffic from each of the plurality of compute devices comprises to detect sequential writes from each of the plurality of compute devices.

Example 13 includes the subject matter of any of Examples 9-12, and wherein the bandwidth burst resource allocator circuitry is further to determine the first amount of bandwidth to be allocated based on one or more services associated with the data traffic from each of the plurality of compute devices; determine the period of time to wait based on the one or more services associated with the data traffic from each of the plurality of compute devices; and determine the second amount of bandwidth to be allocated based on the one or more services associated with the data traffic from each of the plurality of compute devices.

Example 14 includes the subject matter of any of Examples 9-13, and wherein the bandwidth burst resource allocator circuitry is further to monitor, prior to monitoring of the data traffic from each of the plurality of compute devices, bandwidth usage of a plurality of data transfer processes from each of a plurality of source compute devices to a destination storage sled, wherein each of the plurality of data transfer processes is following an increase in sequential writes from each of the plurality of source compute devices to the destination storage sled; determine parameters of the sequential writes from each of the plurality of source compute devices; and determine one or more parameters of a machine-learning-based algorithm based on the parameters of the sequential writes from each of the plurality of source compute devices, wherein to determine the first amount of bandwidth to be allocated comprises to determine the first amount of bandwidth to be allocated with use of the one or more parameters of the machine learning-based algorithm, wherein to determine the period of time to wait comprises to determine the period of time to wait with use of the one or more parameters of the machine learning-based algorithm, and wherein to determine the second amount of bandwidth to be allocated comprises to determine the second amount of bandwidth to be allocated with use of the one or more parameters of the machine learning-based algorithm.

Example 15 includes a method for control of data transfer by a software defined networking (SDN) controller, the method comprising detecting, by the SDN controller, a failure of a storage device of a storage sled of a data center; determining, by the SDN controller, one or more parameters of a tiered bandwidth burst requirement for replication of data that was on the storage device; allocating, by the SDN controller, a first amount of bandwidth on a network of the data center for replication of the data that was on the storage device; determining, by the SDN controller and based on the one or more parameters of the tiered bandwidth burst requirement, a period of time to wait before allocation of additional bandwidth for replication of the data that was on the storage device; and allocating, by the SDN controller, a second amount of bandwidth on the network for replication of data that was on the storage device in response to a determination that the period of time to wait has elapsed.

Example 16 includes the subject matter of Example 15, and further including establishing a virtual local area network (VLAN) on the network, wherein allocating the first amount of bandwidth comprises allocating the first amount of bandwidth for replication of the data on the storage device to the VLAN, wherein allocating the second amount of bandwidth comprises allocating the second amount of bandwidth for replication of the data on the storage device to the VLAN.

Example 17 includes the subject matter of any of Examples 15 and 16, and wherein determining the period of time to wait before allocation of the additional bandwidth comprises determining the period of time to wait before allocation of the additional bandwidth prior to allocation of the first amount of bandwidth, further comprising determining, by the SDN controller, the second amount of bandwidth prior to allocation of the first amount of bandwidth.

Example 18 includes the subject matter of any of Examples 15-17, and further including determining, by the SDN controller, the first amount of bandwidth to be allocated based on one or more parameters of the storage device; determining, by the SDN controller, the period of time to wait based on the one or more parameters of the storage device; and determining, by the SDN controller, the second amount of bandwidth to be allocated based on the one or more parameters of the storage device.

Example 19 includes the subject matter of any of Examples 15-18, and wherein the one or more parameters of the storage device comprise at least one of (i) a number of services associated with the storage device, (ii) a type of storage associated with the storage device, and (iii) a bandwidth associated with the storage device.

Example 20 includes the subject matter of any of Examples 15-19, and further including accessing, by the SDN controller, one or more parameters of a machine-learning-based algorithm, wherein determining the first amount of bandwidth to be allocated comprises determining the first amount of bandwidth to be allocated with use of the one or more parameters of the machine learning-based algorithm, wherein determining the period of time to wait comprises determining the period of time to wait with use of the one or more parameters of the machine learning-based algorithm, and wherein determining the second amount of bandwidth to be allocated comprises determining the second amount of bandwidth to be allocated with use of the one or more parameters of the machine learning-based algorithm.

Example 21 includes the subject matter of any of Examples 15-20, and further including monitoring, by the SDN controller, bandwidth usage of a plurality of data replication processes resulting from failure of a plurality of storage devices; determining, by the SDN controller, parameters of the plurality of storage devices; determining, by the SDN controller, the one or more parameters of the machine-learning-based algorithm based on the monitored bandwidth usage of the plurality of data replication processes and the determined parameters of the plurality of storage devices.

Example 22 includes the subject matter of any of Examples 15-21, and further including allocating, by the SDN controller, a first number of queues of one or more network switches for replication of the data on the storage device; and allocating, by the SDN controller, a second number of queues of the one or more network switches for replication of the data in response to the determination that the period of time to wait has elapsed, wherein the second number of queues to be allocated is predetermined prior to allocation of the first number of queues.

Example 23 includes a method for control of data transfer by a software defined networking (SDN) controller, the method comprising monitoring, by the SDN controller, data traffic from each of a plurality of compute device to a storage sled of a data center over a network of the data center; detecting, by the SDN controller, an indication of a future bandwidth burst based on the data traffic from each of the plurality of compute devices; determining, by the SDN controller, one or more parameters of a tiered bandwidth burst requirement based on the data traffic from each of the plurality of compute devices; allocating, by the SDN controller, a first amount of bandwidth on the network for data transfer from each of the plurality of compute devices based on the determined one or more parameters of the tiered bandwidth burst requirement; determining, by the SDN controller and based on the one or more parameters of the tiered bandwidth burst requirement, a period of time to wait before allocation of additional bandwidth for data transfer from each of the plurality of compute devices; and allocating, by the SDN controller, a second amount of bandwidth on the network for the data transfer from each of the plurality of compute devices in response to a determination that the period of time to wait has elapsed.

Example 24 includes the subject matter of Example 23, and wherein allocating the first amount of bandwidth comprises allocating the first amount of bandwidth to a VLAN associated with data transfer from each of the plurality of compute devices, wherein allocating the second amount of bandwidth comprises allocating the second amount of bandwidth to the VLAN associated with data transfer from each of the plurality of compute devices.

Example 25 includes the subject matter of any of Examples 23 and 24, and wherein determining the period of time to wait before allocation of the additional bandwidth comprises determining the period of time to wait before allocation of the additional bandwidth prior to allocation of the first amount of bandwidth, further comprising determining, by the SDN controller, the second amount of bandwidth prior to allocation of the first amount of bandwidth.

Example 26 includes the subject matter of any of Examples 23-25, and wherein detecting the indication of the future bandwidth burst based on the data traffic from each of the plurality of compute devices comprises detecting sequential writes from each of the plurality of compute devices.

Example 27 includes the subject matter of any of Examples 23-26, and further including determining, by the SDN controller, the first amount of bandwidth to be allocated based on one or more services associated with the data traffic from each of the plurality of compute devices; determining, by the SDN controller, the period of time to wait based on the one or more services associated with the data traffic from each of the plurality of compute devices; and determining, by the SDN controller, the second amount of bandwidth to be allocated based on the one or more services associated with the data traffic from each of the plurality of compute devices.

Example 28 includes the subject matter of any of Examples 23-27, and further including monitoring, by the SDN controller and prior to monitoring the data traffic from each of the plurality of compute devices, bandwidth usage of a plurality of data transfer processes from each of a plurality of source compute devices to a destination storage sled, wherein each of the plurality of data transfer processes is following an increase in sequential writes from each of the plurality of source compute devices to the destination storage sled; determining, by the SDN controller, parameters of the sequential writes from each of the plurality of source compute devices; and determining, by the SDN controller, one or more parameters of a machine-learning-based algorithm based on the parameters of the sequential writes from each of the plurality of source compute devices, wherein determining the first amount of bandwidth to be allocated comprises determining the first amount of bandwidth to be allocated with use of the one or more parameters of the machine learning-based algorithm, wherein determining the period of time to wait comprises determining the period of time to wait with use of the one or more parameters of the machine learning-based algorithm, and wherein determining the second amount of bandwidth to be allocated comprises determining the second amount of bandwidth to be allocated with use of the one or more parameters of the machine learning-based algorithm.

Example 29 includes one or more computer-readable media comprising a plurality of instructions stored thereon that, when executed by a software-defined networking (SDN) controller, causes the SDN controller to perform the method of any of Examples 15-28.

Example 30 includes a software-defined networking (SDN) controller comprising means to perform the method of any of Examples 15-28.

Example 31 includes one or more computer-readable media comprising a plurality of instructions stored thereon that, when executed by a software-defined networking (SDN) controller, causes the SDN controller to detect a failure of a storage device of a storage sled of a data center; determine one or more parameters of a tiered bandwidth burst requirement for replication of data that was on the storage device; allocate a first amount of bandwidth on a network of the data center for replication of the data that was on the storage device; determine, based on the one or more parameters of the tiered bandwidth burst requirement, a period of time to wait before allocation of additional bandwidth for replication of the data that was on the storage device; and allocate a second amount of bandwidth on the network for replication of data that was on the storage device in response to a determination that the period of time to wait has elapsed.

Example 32 includes the subject matter of Example 31, and wherein the plurality of instructions further causes the SDN controller to establish a virtual local area network (VLAN) on the network, wherein to allocate the first amount of bandwidth comprises to allocate the first amount of bandwidth for replication of the data on the storage device to the VLAN, wherein to allocate the second amount of bandwidth comprises to allocate the second amount of bandwidth for replication of the data on the storage device to the VLAN.

Example 33 includes the subject matter of any of Examples 31 and 32, and wherein to determine the period of time to wait before allocation of the additional bandwidth comprises to determine the period of time to wait before allocation of the additional bandwidth prior to allocation of the first amount of bandwidth, wherein the plurality of instructions further causes the SDN controller to determine the second amount of bandwidth prior to allocation of the first amount of bandwidth.

Example 34 includes the subject matter of any of Examples 31-33, and wherein the plurality of instructions further causes the SDN controller to determine the first amount of bandwidth to be allocated based on one or more parameters of the storage device; determine the period of time to wait based on the one or more parameters of the storage device; and determine the second amount of bandwidth to be allocated based on the one or more parameters of the storage device.

Example 35 includes the subject matter of any of Examples 31-34, and wherein the one or more parameters of the storage device comprise at least one of (i) a number of services associated with the storage device, (ii) a type of storage associated with the storage device, and (iii) a bandwidth associated with the storage device.

Example 36 includes the subject matter of any of Examples 31-35, and wherein the plurality of instructions further causes the SDN controller to access one or more parameters of a machine-learning-based algorithm, wherein to determine the first amount of bandwidth to be allocated comprises to determine the first amount of bandwidth to be allocated with use of the one or more parameters of the machine learning-based algorithm, wherein to determine the period of time to wait comprises to determine the period of time to wait with use of the one or more parameters of the machine learning-based algorithm, and wherein to determine the second amount of bandwidth to be allocated comprises to determine the second amount of bandwidth to be allocated with use of the one or more parameters of the machine learning-based algorithm.

Example 37 includes the subject matter of any of Examples 31-36, and wherein the plurality of instructions further causes the SDN controller to monitor bandwidth usage of a plurality of data replication processes resulting from failure of a plurality of storage devices; determine parameters of the plurality of storage devices; determine the one or more parameters of the machine-learning-based algorithm based on the monitored bandwidth usage of the plurality of data replication processes and the determined parameters of the plurality of storage devices.

Example 38 includes the subject matter of any of Examples 31-37, and wherein the plurality of instructions further causes the SDN controller to allocate a first number of queues of one or more network switches for replication of the data on the storage device; and allocate a second number of queues of the one or more network switches for replication of the data in response to the determination that the period of time to wait has elapsed, wherein the second number of queues to be allocated is predetermined prior to allocation of the first number of queues.

Example 39 includes one or more computer-readable media comprising a plurality of instructions stored thereon that, when executed by a software-defined networking (SDN) controller, causes the SDN controller to monitor data traffic from each of a plurality of compute device to a storage sled of a data center over a network of the data center; detect an indication of a future bandwidth burst based on the data traffic from each of the plurality of compute devices; determine one or more parameters of a tiered bandwidth burst requirement based on the data traffic from each of the plurality of compute devices; allocate a first amount of bandwidth on the network for data transfer from each of the plurality of compute devices based on the determined one or more parameters of the tiered bandwidth burst requirement; determine, based on the one or more parameters of the tiered bandwidth burst requirement, a period of time to wait before allocation of additional bandwidth for data transfer from each of the plurality of compute devices; and allocate a second amount of bandwidth on the network for the data transfer from each of the plurality of compute devices in response to a determination that the period of time to wait has elapsed.

Example 40 includes the subject matter of Example 39, and wherein to allocate the first amount of bandwidth comprises to allocate the first amount of bandwidth to a VLAN associated with data transfer from each of the plurality of compute devices, wherein to allocate the second amount of bandwidth comprises to allocate the second amount of bandwidth to the VLAN associated with data transfer from each of the plurality of compute devices.

Example 41 includes the subject matter of any of Examples 39 and 40, and wherein to determine the period of time to wait before allocation of the additional bandwidth comprises to determine the period of time to wait before allocation of the additional bandwidth prior to allocation of the first amount of bandwidth, wherein the plurality of instructions further cause the SDN controller to determine the second amount of bandwidth prior to allocation of the first amount of bandwidth.

Example 42 includes the subject matter of any of Examples 39-41, and wherein to detect the indication of the future bandwidth burst based on the data traffic from each of the plurality of compute devices comprises to detect sequential writes from each of the plurality of compute devices.

Example 43 includes the subject matter of any of Examples 39-42, and wherein the plurality of instructions further cause the SDN controller to determine the first amount of bandwidth to be allocated based on one or more services associated with the data traffic from each of the plurality of compute devices; determine the period of time to wait based on the one or more services associated with the data traffic from each of the plurality of compute devices; and determine the second amount of bandwidth to be allocated based on the one or more services associated with the data traffic from each of the plurality of compute devices.

Example 44 includes the subject matter of any of Examples 39-43, and wherein the plurality of instructions further cause the SDN controller to monitor, prior to monitoring of the data traffic from each of the plurality of compute devices, bandwidth usage of a plurality of data transfer processes from each of a plurality of source compute devices to a destination storage sled, wherein each of the plurality of data transfer processes is following an increase in sequential writes from each of the plurality of source compute devices to the destination storage sled;

determine parameters of the sequential writes from each of the plurality of source compute devices; and determine one or more parameters of a machine-learning-based algorithm based on the parameters of the sequential writes from each of the plurality of source compute devices, wherein to determine the first amount of bandwidth to be allocated comprises to determine the first amount of bandwidth to be allocated with use of the one or more parameters of the machine learning-based algorithm, wherein to determine the period of time to wait comprises to determine the period of time to wait with use of the one or more parameters of the machine learning-based algorithm, and wherein to determine the second amount of bandwidth to be allocated comprises to determine the second amount of bandwidth to be allocated with use of the one or more parameters of the machine learning-based algorithm.

The invention claimed is:

1. A controller to control data transfer comprising:
circuitry to:
detect a failure of a storage device of a data center;
determine one or more parameters of a tiered bandwidth burst requirement for replication of data stored on the storage device;
allocate a first amount of bandwidth on a network of the data center for replication of the data stored on the storage device;
determine, based on the one or more parameters of the tiered bandwidth burst requirement, a period of time to wait before allocation of additional bandwidth for replication of the data stored on the storage device; and
allocate a second amount of bandwidth on the network for replication of the data stored on the storage device in response to a determination that the period of time to wait has elapsed.

2. The controller of claim 1, wherein circuitry is further to establish a virtual local area network (VLAN) on the network,
wherein to allocate the first amount of bandwidth comprises to allocate the first amount of bandwidth for replication of the data on the storage device to the VLAN,
wherein to allocate the second amount of bandwidth comprises to allocate the second amount of bandwidth for replication of the data on the storage device to the VLAN.

3. The controller of claim 1, wherein to determine the period of time to wait before the allocation of the additional bandwidth comprises to determine the period of time to wait before allocation of the additional bandwidth prior to allocation of the first amount of bandwidth,
wherein the data replication resource allocator is further to determine the second amount of bandwidth prior to allocation of the first amount of bandwidth.

4. The controller of claim 1, wherein the circuitry is further to:
determine the first amount of bandwidth to be allocated based on one or more parameters of the storage device;
determine the period of time to wait based on the one or more parameters of the storage device; and
determine the second amount of bandwidth to be allocated based on the one or more parameters of the storage device.

5. The controller of claim 4, wherein the one or more parameters of the storage device comprise at least one of (i) a number of services associated with the storage device, (ii) a type of storage associated with the storage device, and (iii) a bandwidth associated with the storage device.

6. The controller of claim 4, wherein the circuitry is further to access one or more parameters of a machine learning-based algorithm,
wherein to determine the first amount of bandwidth to be allocated comprises to determine the first amount of bandwidth to be allocated with use of the one or more parameters of the machine learning-based algorithm,
wherein to determine the period of time to wait comprises to determine the period of time to wait with use of the one or more parameters of the machine learning-based algorithm, and
wherein to determine the second amount of bandwidth to be allocated comprises to determine the second amount of bandwidth to be allocated with use of the one or more parameters of the machine learning-based algorithm.

7. The controller of claim 6, wherein the circuitry is further to:
monitor bandwidth usage of a plurality of data replication processes resulting from failure of a plurality of storage devices;
determine parameters of the plurality of storage devices; and
determine the one or more parameters of the machine learning-based algorithm based on the monitored bandwidth usage of the plurality of data replication processes and the determined parameters of the plurality of storage devices.

8. The controller of claim 1, wherein circuitry is further to:
allocate a first number of queues of one or more network switches for replication of the data on the storage device; and
allocate a second number of queues of the one or more network switches for replication of the data in response to the determination that the period of time to wait has elapsed, wherein the second number of queues to be allocated is predetermined prior to allocation of the first number of queues.

9. One or more computer-readable media comprising a plurality of instructions stored thereon that, when executed by a controller, causes the controller to:
detect a failure of a storage device of a data center;
determine one or more parameters of a tiered bandwidth burst requirement for replication of data stored on the storage device;
allocate a first amount of bandwidth on a network of the data center for replication of the data stored on the storage device;
determine, based on the one or more parameters of the tiered bandwidth burst requirement, a period of time to wait before allocation of additional bandwidth for replication of the data stored on the storage device; and
allocate a second amount of bandwidth on the network for replication of the data stored on the storage device in response to a determination that the period of time to wait has elapsed.

10. The one or more computer-readable media of claim 9, wherein the plurality of instructions further causes the controller to establish a virtual local area network (VLAN) on the network,
wherein to allocate the first amount of bandwidth comprises to allocate the first amount of bandwidth for replication of the data on the storage device to the VLAN, wherein to allocate the second amount of bandwidth comprises to allocate the second amount of bandwidth for replication of the data on the storage device to the VLAN.

11. The one or more computer-readable media of claim 9, wherein to determine the period of time to wait before allocation of the additional bandwidth comprises to determine the period of time to wait before allocation of the additional bandwidth prior to allocation of the first amount of bandwidth,
 wherein the plurality of instructions further causes the controller to determine the second amount of bandwidth prior to allocation of the first amount of bandwidth.

12. The one or more computer-readable media of claim 9, wherein the plurality of instructions further causes the controller to:
 determine the first amount of bandwidth to be allocated based on one or more parameters of the storage device;
 determine the period of time to wait based on the one or more parameters of the storage device; and
 determine the second amount of bandwidth to be allocated based on the one or more parameters of the storage device.

13. The one or more computer-readable media of claim 12, wherein the one or more parameters of the storage device comprise at least one of (i) a number of services associated with the storage device, (ii) a type of storage associated with the storage device, and (iii) a bandwidth associated with the storage device.

14. The one or more computer-readable media of claim 12, wherein the plurality of instructions further causes the controller to access one or more parameters of a machine learning-based algorithm,
 wherein to determine the first amount of bandwidth to be allocated comprises to determine the first amount of bandwidth to be allocated with use of the one or more parameters of the machine learning-based algorithm,
 wherein to determine the period of time to wait comprises to determine the period of time to wait with use of the one or more parameters of the machine learning-based algorithm, and
 wherein to determine the second amount of bandwidth to be allocated comprises to determine the second amount of bandwidth to be allocated with use of the one or more parameters of the machine learning-based algorithm.

\* \* \* \* \*